United States Patent
Park et al.

(10) Patent No.: US 7,362,689 B2
(45) Date of Patent: Apr. 22, 2008

(54) OPTICAL PICKUP AND OPTICAL RECORDING AND/OR REPRODUCING APPARATUS ADOPTING THE SAME

(75) Inventors: Sun-mook Park, Suwon-si (KR); Jin-ho Jung, Seongnam-si (KR); Pyong-yong Seong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 607 days.

(21) Appl. No.: 10/926,150

(22) Filed: Aug. 26, 2004

(65) Prior Publication Data

US 2005/0047292 A1    Mar. 3, 2005

(30) Foreign Application Priority Data

Aug. 26, 2003   (KR)   .................. 10-2003-0059143

(51) Int. Cl.
   *G11B 7/00*   (2006.01)
(52) U.S. Cl. ............. 369/112.01; 369/103; 369/112.07; 369/112.1; 369/44.41
(58) Field of Classification Search ........... 369/112.01, 369/112.1, 112.02, 103, 44.23, 44.24, 110.02, 369/110.03, 112.15, 112.06, 112.07, 112.03, 369/44.41, 44.42
See application file for complete search history.

(56) References Cited

U.S. PATENT DOCUMENTS 6,275,463 B1    8/2001   Nagata et al.
6,891,675 B2 *  5/2005   Ohyama ..................... 359/566

FOREIGN PATENT DOCUMENTS

| JP | 11-073658 | 3/1999 |
| JP | 11-161980 | 6/1999 |
| JP | 2001-266369 | 9/2001 |
| KR | 2001-106787 | 12/2001 |

OTHER PUBLICATIONS

Office Action for corresponding Korean Application No. 10-2003-0059143 dated Apr. 25, 2005.

* cited by examiner

*Primary Examiner*—Nabil Hindi
(74) *Attorney, Agent, or Firm*—Staas & Halsey LLP

(57) ABSTRACT

An optical pickup which, when a first light reflected by a recording medium is divided into a central light area and first and second peripheral light areas at both sides of the central light area, divides the first light reflected by the recording medium into at least 6 light areas, and the at least 6 light areas are independently detected from first through sixth light-receiving portions of a photodetector. Hence, the photodetector can detect a tracking error signal whose offset generation due to a shift of an objective lens is insensitive and whose offset generation due to an initial photodetector balance deviation is depressed.

35 Claims, 19 Drawing Sheets

OPTICAL PICKUP AND OPTICAL RECORDING AND/OR REPRODUCING APPARATUS ADOPTING THE SAME

CROSS-REFERENCE TO RELATED APPLICATION

This application claims the benefit of Korean Patent Application No. 2003-59143, filed on Aug. 26, 2003, in the Korean Intellectual Property Office, the disclosure of which is incorporated herein by reference.

BACKGROUND OF THE INVENTION

1. Field of the Invention

The present invention relates to an optical recording and/or reproducing apparatus, and more particularly, to an optical pickup capable of preventing a tracking offset from being generated due to a shift of an objective lens and an initial balance deviation of a photodetector and an optical recording and/or reproducing apparatus adopting the optical pickup.

2. Description of Related Art

In high capacity recording and/or reproduction, accurate detection of a focusing and/or tracking error signal is necessary for performing a stable servo function. Generally, an optical pickup is composed of a light source, an objective lens, and a light-receiving optical system. The objective lens focuses light emitted from the light source on a recording surface of an optical disc, and the light-receiving optical system detects an information signal and an error signal from light reflected by the optical disc and passed through the objective lens.

U.S. Patent Publication No. 2002-0159378 A1 (published on Oct. 31, 2002) to the applicant of the present invention discloses an optical pickup capable of detecting a tracking error signal in which an offset generation due to a shift of an objective lens is low and a focusing error signal in which an offset generation due to a distortion of a photodetector or a temperature change (including a change of a wavelength of light) is low.

FIGS. 1 through 3 illustrate a diffraction unit 30, a photodetector 50, and a signal processing unit, respectively, which are disclosed in U.S. Patent Publication No. 2002-0559378 A1. The photodetector 50 receives light reflected by an optical disc and passed through the diffraction unit 30 of FIG. 1, and the signal processing unit detects a tracking error signal. Since a detailed description of FIGS. 1 through 3 has been made in the Detailed Description of the Invention of the above publication, only necessary parts will now be described.

Referring to FIG. 1, the diffraction unit 30 is divided into first through fifth diffraction areas E", A", B", C", and D".

To transmit light with a specific wavelength travelling toward a recording medium and diffract light with the specific wavelength reflected by the recording medium, the diffraction unit 30 includes a polarization hologram layer (not shown) and a polarization changing layer (not shown) (i.e., a quarter wave plate) formed on a surface of the polarization hologram layer that faces the recording medium. To compatibly adopt CDs and DVDs, the diffraction unit 30 also includes an aperture filter (not shown) and a phase compensator (not shown). The aperture filter adjusts numerical apertures of the light with the specific wavelength and lights with other wavelengths. The phase compensator compensates for a spherical aberration generated upon data recording and/or reproduction from an optical disc having a thickness deviating from a design condition of an objective lens.

Referring to FIG. 2, the photodetector 50 includes first through fifth light-receiving portions 53, 55, 56, 57, and 58, which respectively receive lights with a specific wavelength reflected by the recording medium and diffracted by the first through fifth diffraction areas E", A", B", C", and D" of the diffraction unit 30 and perform photoelectric conversion on the received lights. The photodetector 50 further includes a main light-receiving portion 51, which receives zeroth-order-diffracted light passed through the first through fifth diffraction areas E", A", B", C", and D" and detects a reproduction signal from the received light.

The first light-receiving portion 53 is divided into a four-sectioned light-receiving area E, F, G, and H in radial and tangential directions of the optical disc (hereinafter, referred to as R and T directions). The four-sectioned light-receiving area E, F, G, and H receives $+1^{st}$ order light diffracted by the first diffraction area E". The second through fifth light-receiving portions 55, 56, 57, and 58 include single light-receiving areas 55a, 56a, 57a, and 58a, respectively, which receive $-1^{st}$ order light diffracted by the second through fifth diffraction areas A", B", C", and D". The second through fifth light-receiving portions 55, 56, 57, and 58 also include bisectioned light-receiving areas 55b, 56b, 57b, and 58b, respectively, which receive $+1^{st}$ order light diffracted by the second through fifth diffraction areas A", B", C", and D".

Each of the bisectioned light-receiving areas 55b, 56b, 57b, and 58b is divided into inner and outer light-receiving areas in the T direction. The inner light-receiving area receives a central part of the light, and the outer light-receiving area receives a peripheral part of the light.

FIG. 3 illustrates the signal processing unit which detects a tracking error signal. In FIG. 3, reference characters E, F, G and H used to indicate the four-sectioned light-receiving area of the first light-receiving portion 53 also indicate detection signals of the four-sectioned light-receiving areas of the first light-receiving portion 53, respectively. Reference characters A, B, C, and D denote detection signals of the single light-receiving areas 55a, 56a, 57a, and 58a of the second through fifth light-receiving portions 55, 56, 57, and 58, respectively.

Referring to FIG. 3, the signal processing unit includes respective first, second, and third subtractors 71, 73, and 77. The first subtractor 71 detects a corrected far field (CFF) signal CFF from the detection signals A, B, C, and D of the single light-receiving areas 55a, 56a, 57a, and 58a of the second through fifth light-receiving portions 55, 56, 57, and 58 using a CFF tracking technique. The second subtractor 73 detects a push-pull (PP) signal PP from the detection signals E, F, G, and H of the four-sectioned light-receiving area of the first light-receiving portion 53 using a Push-pull technique. The third subtractor 77 subtracts between the signals CFF and PP and outputs a tracking error signal $TES_{conventional}$. The signal processing unit further includes a gain adjuster 75 which amplifies the signal PP by a gain k' and applies a result of the amplification to the third subtractor 77.

The signal CFF denotes a signal detected using a signal arithmetic process used in the Push-pull technique from signals (i.e., detection signals) detected from light-receiving areas of a photodetector which receive lights previously divided by a hologram.

When an objective lens (not shown) is shifted, the positions of the $-1^{st}$ order lights diffracted by the second through fifth diffraction areas A", B", C", and D" of the diffraction unit 30 and received by the single light-receiving areas 55a, 56a, 57a, and 58a of the second through fifth light-receiving portions 55, 56, 57, and 58 of the photodetector 50 are shifted. Consequently, the signal CFF has an offset of M and can be given by: CFF=M+N sin(wt) as shown in FIG. 3.

Since a cross-section of the +1$^{st}$ order light diffracted by the first diffraction area E'' and received by the four-sectioned light-receiving area E, F, G, and H of the first light-receiving portion 53 is enlarged in the R direction, the signal PP detected from the +1$^{st}$ order light is less sensitive to the shift of the objective lens. Accordingly, the signal PP is a DC signal having a magnitude of approximately m.

Hence, if the gain k' of the gain adjuster 75 is set so that k' m-M is 0, the third subtractor 77 outputs a tracking error signal TES that keeps a balance regardless of a shift of the objective lens.

In a conventional tracking method disclosed in the above U.S. Patent publication, the tracking error signal TES is obtained by subtracting between the signal CFF obtained from the detection signals A, B, C, and D and a signal obtained by multiplying the signal PP obtained from the detection signals E, F, G, and H by the gain k'. The gain k' is obtained by dividing an inclination of the signal CFF generated upon a shift of the objective lens by an inclination of the signal PP generated upon the shift of the objective lens.

FIG. 4 illustrates offsets of the signal CFF, the signal PP, and the tracking error signal TES$_{conventional}$ upon a shift of the objective lens when the conventional tracking method disclosed in the above publication is used. As illustrated in FIG. 4, the offsets of the signals CFF and PP linearly increase in proportion to a shift amount of the objective lens, but the tracking error signal TES has no offset.

As a result, when the conventional tracking method disclosed in the above publication is used, a tracking error signal TES in which an offset generation is low even upon a shift of the objective lens can be detected.

However, when there is an initial offset due to an initial photodetector balance deviation, the offset is amplified. In other words, since the signal PP is detected using a typical push-pull technique, in which light reflected by a recording medium is divided according to a partition structure of a photodetector to detect a PP signal, the signal PP is affected by the initial photodetector balance deviation, and thus the initial offset due to the initial photodetector balance deviation is amplified.

FIGS. 5A and 5B are used to explain an influence of an initial photodetector balance offset upon a PP signal detected using the typical push-pull technique. FIG. 5A illustrates light received by a photodetector 9 when there is no initial photodetector balance offset. FIG. 5B illustrates the shift of light received by the photodetector 9 when there is an initial photodetector balance offset. In FIG. 5B, d denotes an initial photodetector balance deviation. The initial photodetector balance deviation denotes a distortion of a photodetector balance upon assembly of an optical pickup optical system. The initial photodetector balance offset denotes an offset generated due to the initial photodetector balance deviation.

An optical system illustrated in FIGS. 5A and 5B corresponds to a major part of an optical pickup that can detect a PP signal using a push-pull technique. In the optical system of FIGS. 5A and 5B, a hologram 5 and a photodetector 9 having two light-receiving areas 9a and 9b are included to divide light reflected by a recording medium 1 into two parts. The hologram 5 is installed between an objective lens 3 and a collimating lens (or a detection lens) 7.

As can be seen from a comparison of FIGS. 5A and 5B, when the typical push-pull technique is used to detect a PP signal and there is an initial photodetector balance offset (d), an offset is generated in the PP signal. Hence, even when the shift amount of the objective lens 3 is zero, the offset of the detected PP signal does not become zero.

Hence, if there exists an initial photodetector balance offset as illustrated in FIG. 6 upon the use of the conventional tracking method disclosed in the aforementioned publication, the PP signal has a push-pull offset, and accordingly, a tracking error signal TES has a large offset.

FIG. 6 illustrates offsets of a CFF signal, a PP signal, and a TES with respect to a shift amount of an objective lens when there is the initial photodetector balance offset and the conventional tracking method disclosed in the above publication is used. In FIG. 6, ba is the initial photodetector balance offset. As illustrated in FIG. 6, the offset of the PP signal is a sum of the initial photodetector balance offset and an offset generated due to the shift of the objective lens.

Also, even when an initial photodetector balance is mismatched, an offset due to the initial photodetector balance deviation is not generated in the CFF signal. In other words, an offset is generated in the CFF signal only when the objective lens is shifted.

However, when there exists an initial photodetector balance offset, the PP signal has an offset, and accordingly, a tracking error signal TES has a larger offset. The offset of the tracking error signal TES is a product of the offset of the PP signal and the gain k'.

As illustrated in FIG. 6, in the tracking error signal TES detected according to the conventional tracking method to remove an offset generated due to a shift of an objective lens, the offset due to the initial photodetector balance deviation is more amplified than that included in the PP signal.

In the above publication, light division by the diffraction unit 30 is not an order division but an area division, such that the offset amount of the PP signal may be changed by a transfer between reproduction/recording and a transfer between recorded/unrecorded areas.

Hence, when an offset due to an initial photodetector balance deviation exists in such a conventional optical pickup as described in the above publication, a tracking error signal has a large offset, and the offset of the tracking error signal varies depending on the transfer between reproduction and recording and the transfer between recorded and unrecorded areas. Further, the conventional optical pickup may record data on a recording medium while being detracked due to an offset of the tracking error signal.

BRIEF SUMMARY

Embodiments of the present invention provide an optical pickup capable of detecting a tracking error signal that has not only an offset insensitive to a shift of an objective lens but also an offset insensitive to an initial balance deviation of a photodetector and an optical recording and/or reproducing apparatus adopting the optical pickup.

According to an aspect of the present invention, there is provided an optical pickup including: a first light source emitting a first light with a wavelength; a first light path changer changing a traveling path of the first light; an objective lens focusing the first light and forming a light spot on a recording medium; a diffraction unit including first and second central diffraction areas which divide at least a part of a central light area into two sub-areas in a first direction and diffract light to the two sub-areas, first and second peripheral diffraction areas which divide a first peripheral light area into two sub-areas in a second direction and diffract light to the two sub-areas, and third and fourth peripheral diffraction areas which divide a second peripheral light area into two sub-areas in a second direction and diffract light to the two sub-areas, the diffraction unit dividing the first light reflected by the recording medium into at least 6 light areas and diffracting the at least 6 light areas; and a first photodetector including first and second light-receiving portions receiving the first light diffracted into a $+1^{st}$ or $-1^{st}$ order light by the first and second central diffraction areas and converting the first light into an electrical signal, and third through sixth light-receiving portions receiving a $+1^{st}$ order light and/or a $-1^{st}$ order light diffracted by the first through fourth peripheral diffraction areas. The first direction is a radial direction and the second direction is a tangential direction. The first light reflected by the recording medium is divided into the central light area and the first peripheral light area and the second peripheral light area. The first and second peripheral light areas are at respective sides of the central light area.

Each of the first and second central diffraction areas may be either a single diffraction area or a pair of diffraction areas arranged in the second direction.

The first light-receiving portion may receive light diffracted by the first central diffraction area and may include either a single light-receiving area or a pair of light-receiving areas arranged in the first direction. The second light-receiving portion may receive light diffracted by the second central diffraction area and may include either a single light-receiving area or a pair of light-receiving areas arranged in the first direction.

The first and second central diffraction areas may divide a part of the central light area into two sub-areas in the first direction and diffract the two sub-areas. The diffraction unit may further include a third central diffraction area diffracting the remaining part of the central light area.

The first light-receiving portion may receive light diffracted by the first central diffraction area and may include either a single light-receiving area or a pair of light-receiving areas arranged in the first direction. The second light-receiving portion may receive light diffracted by the second central diffraction area and may include either a single light-receiving area or a pair of light-receiving areas arranged in the first direction. The first photodetector may include a seventh light-receiving portion, which receives light diffracted by the third central diffraction area and includes either a single light-receiving area or a pair of light-receiving areas arranged in the second direction.

The first light may transmit an information reproduction signal which is a sum signal of signals detected from $+1^{st}$ or $-1^{st}$ order lights received by the third through sixth light-receiving portions and a signal detected from a $+1^{st}$ or $-1^{st}$ order light received by the seventh light-receiving portion.

Each of the first and second light-receiving portions may be wide in the first direction.

The first and second light-receiving portions may be arranged in the second direction. Patterns may be formed on the first and second central diffraction areas so that the $+1^{st}$ or $-1^{st}$ order lights diffracted by the first and second central diffraction areas are received by the first and second light-receiving portions.

Patterns may be formed on the first through fourth peripheral diffraction areas so that one of the $+1^{st}$ and $-1^{st}$ order lights diffracted by the first through fourth peripheral diffraction areas is diverged relatively to a zeroth order light and that the other light is converged relatively to the zeroth order light.

The first through fourth peripheral diffraction areas may be sequentially arranged clockwise or counterclockwise. The $-1^{st}$ order lights diffracted by the first and third peripheral diffraction areas and the $+1^{st}$ order lights diffracted by the second and fourth peripheral diffraction areas may be focused at a first focal point. The $+1^{st}$ order lights diffracted by the first and third peripheral diffraction areas and the $-1^{st}$ order lights diffracted by the second and fourth peripheral diffraction areas may be focused at a second focal point. The first photodetector may be located between the first and second focal points in an on-focus state.

The optical pickup may further include a second light source emitting a second light having a wavelength different from the wavelength of the first light emitted from the first light source so that recording media of different formats are compatibly adopted.

One of the first and second lights is in an infrared wavelength range suitable for recording data in and/or reproducing data from a CD-family recording medium, and the other light is in a red wavelength range suitable for recording data in and/or reproducing data from a DVD-family recording medium.

The diffraction unit may be disposed between the first light path changer and the objective lens and may include: a polarization hologram layer selectively diffracting the first light according to a polarization of the first light so that a first light traveling from the first light source toward a recording medium is transmitted straight and a first light reflected by the recording medium is diffracted and transmitting the second light regardless of a polarization of the second light; and a polarization change layer formed on a side of the polarization hologram layer that faces the recording medium, changing a polarization of an incident light.

According to another aspect of the present invention, there is provided an optical recording and/or reproducing apparatus including: an optical pickup emitting light onto a recording medium and receiving light reflected by a recording surface of the recording medium; and a signal processor detecting a tracking error signal and/or a centering signal of a photodetector. The optical pickup includes: a first light source emitting a first light with a wavelength; a first light path changer changing a traveling path of the first light; an objective lens focusing the first light and forming a light spot on a recording medium; a diffraction unit; and a first photodetector. The diffraction unit includes: first and second central diffraction areas which divide at least a part of a central light area into two sub-areas in a first direction and diffract the two sub-areas; first and second peripheral diffraction areas which divide a first peripheral light area into two sub-areas in a second direction and diffract the two sub-areas; and third and fourth peripheral diffraction areas which divide a second peripheral light area into two sub-areas in the second direction and diffract the two sub-areas. The diffraction unit dividing the first light reflected by the recording medium into at least 6 light areas and diffracting the at least 6 light areas. The first photodetector includes: first and second light-receiving portions receiving the first light diffracted into a $+1^{st}$ or $-1^{st}$ order light by the first and second central diffraction areas and converting the first light into an electrical signal; and third through sixth light-receiving portions receiving a $+1^{st}$ order light and/or a $-1^{st}$ order light diffracted by the first through fourth peripheral diffraction areas. The signal processor detects the tracking error signal and/or the centering signal of the photodetector from detection signals of at least some of the first through sixth light-receiving portions. The first direction is a radial direction and the second direction is a tangential direction.

The first light reflected by the recording medium is divided into the central light area and the first peripheral light area and the second peripheral light area. The first and second peripheral light areas are at respective sides of the central light area.

When the first through fourth peripheral diffraction areas are sequentially arranged clockwise or counterclockwise and signals detected from $+1^{st}$ or $-1^{st}$ order lights received by the first through sixth light-receiving portions are referred to as E, F, A, B, C, and D, respectively, the signal processor detects a tracking error signal (TES) given by the following equation:

$$TES=((A+B)-(C+D))-k*(E-F), k>0.$$

When each of the first and second light-receiving portions is a pair of light-receiving areas arranged in the first direction, signals detected from $+1^{st}$ or $-1^{st}$ order lights received by the light-receiving areas of the first light-receiving portion are referred to as E1 and E2, and signals detected from $+1^{st}$ or $-1^{st}$ order lights received by the light-receiving areas of the second light-receiving portion are referred to as F1 and F2, the signal processor may detect a radial centering signal (RAD CENTERING SIGNAL) of a photodetector given by the following equation:

$$RAD\ CENTERING\ SIGNAL=(E1+F1)-(E2+F2).$$

The first and second central diffraction areas may divide a part of the central light area into two sub-areas in the first direction and diffract the two sub-areas. The diffraction unit may further include a third central diffraction area diffracting the remaining part of the central light area.

The first photodetector may further include a seventh light-receiving portion which receives light diffracted by the third central diffraction area and includes either a single light-receiving area or a pair of light-receiving areas arranged in the second direction.

When the seventh light-receiving portion is composed of a pair of light-receiving areas arranged in the second direction, and signals detected from $+1^{st}$ or $-1^{st}$ order lights received by the light-receiving areas of the seventh light-receiving portion are referred to as Y1 and Y2, the signal processor may detect a tangential centering signal (TAN CENTERING SIGNAL) for the photodetector given by the following equation:

$$TAN\ CENTERING\ SIGNAL=Y1-Y2.$$

According to another aspect of the present invention, there is provided a method of using a photodetector to detect a tracking error signal whose offset generation due to a shift of an objective lens is insensitive and whose offset generation due to an initial balance deviation of the photodetector is depressed. The method includes: dividing a light reflected by an optical disc into a central light area and peripheral light areas located at sides of the central light area; dividing the entire central light area or a part of the central light area into two sub-areas by a diffraction unit; and detecting the light.

According to still another aspect of the present invention, there is provided a method of suppressing generation of an offset in a tracking error signal due to an initial photodetector balance deviation. The method includes: dividing the light reflected from a recording medium into a central light area and first and second peripheral light areas at respective sides of the central light area; dividing, at first and second central diffraction areas, at least a part of a central light area into two sub-areas in a radial direction and diffracting light to the at the two sub-areas; dividing, at first and second peripheral diffraction areas, a first peripheral light area into two sub-areas in a tangential direction and diffracting light to the two sub-areas; dividing, at third and fourth peripheral diffraction areas, a second peripheral light area into two sub-areas in a second direction and diffract light to the two sub-areas; receiving, at first and second light-receiving portions of a photodetector, the light diffracted into a $+1^{st}$ or $-1^{st}$ order light by the first and second central diffraction areas and converting the first light into an electrical signal; and receiving, at third through sixth light-receiving portions, a $+1^{st}$ order light and/or a $-1^{st}$ order light diffracted by the first through fourth peripheral diffraction areas. The diffraction unit divides the first light reflected by the recording medium into at least 6 light areas and diffracting the at least 6 light areas.

According to another aspect of the present invention, there is provided a diffraction unit dividing a light reflected by a recording medium into at least 6 light areas and diffracting the at least 6 light areas. The diffraction unit includes: first and second central diffraction areas which divide at least a part of a central light area of the reflected light into two sub-areas in a radial direction and diffract the two sub-areas; first and second peripheral diffraction areas which divide a first peripheral light area of the reflected light into two sub-areas in a tangential direction and diffract the two sub-areas; and third and fourth peripheral diffraction areas which divide a second peripheral light area of the reflected light into two sub-areas in the tangential direction and diffract the two sub-areas.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
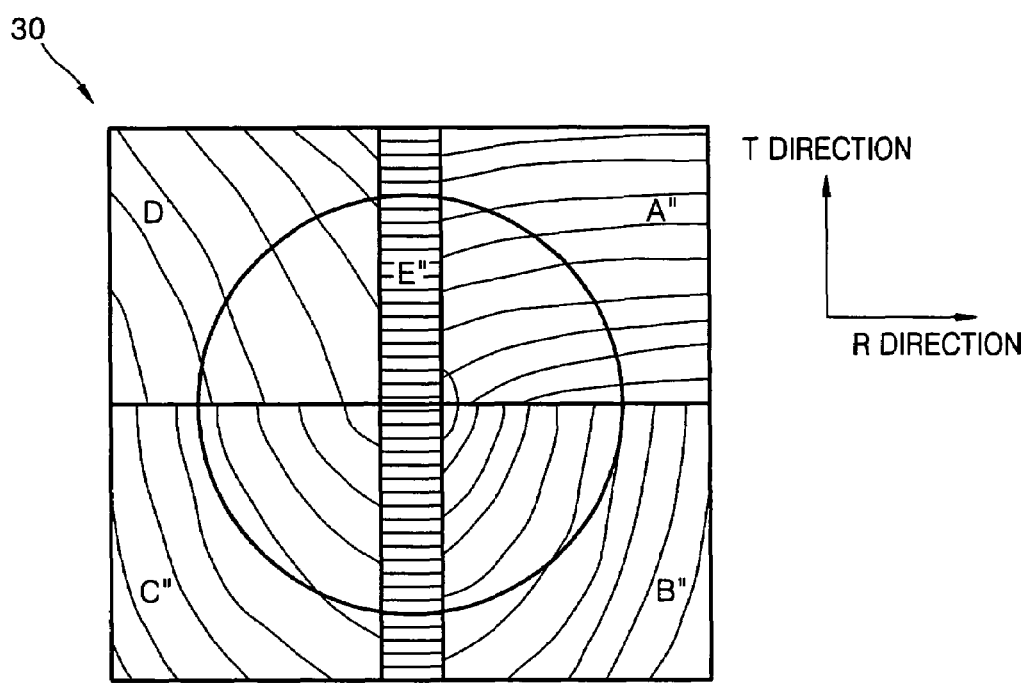
FIGS. 1 through 3 illustrate a diffraction unit, a photodetector, and a signal processing unit, respectively, which are disclosed in U.S. Patent Publication No. 2002-0159378 A1.
Figure 2:
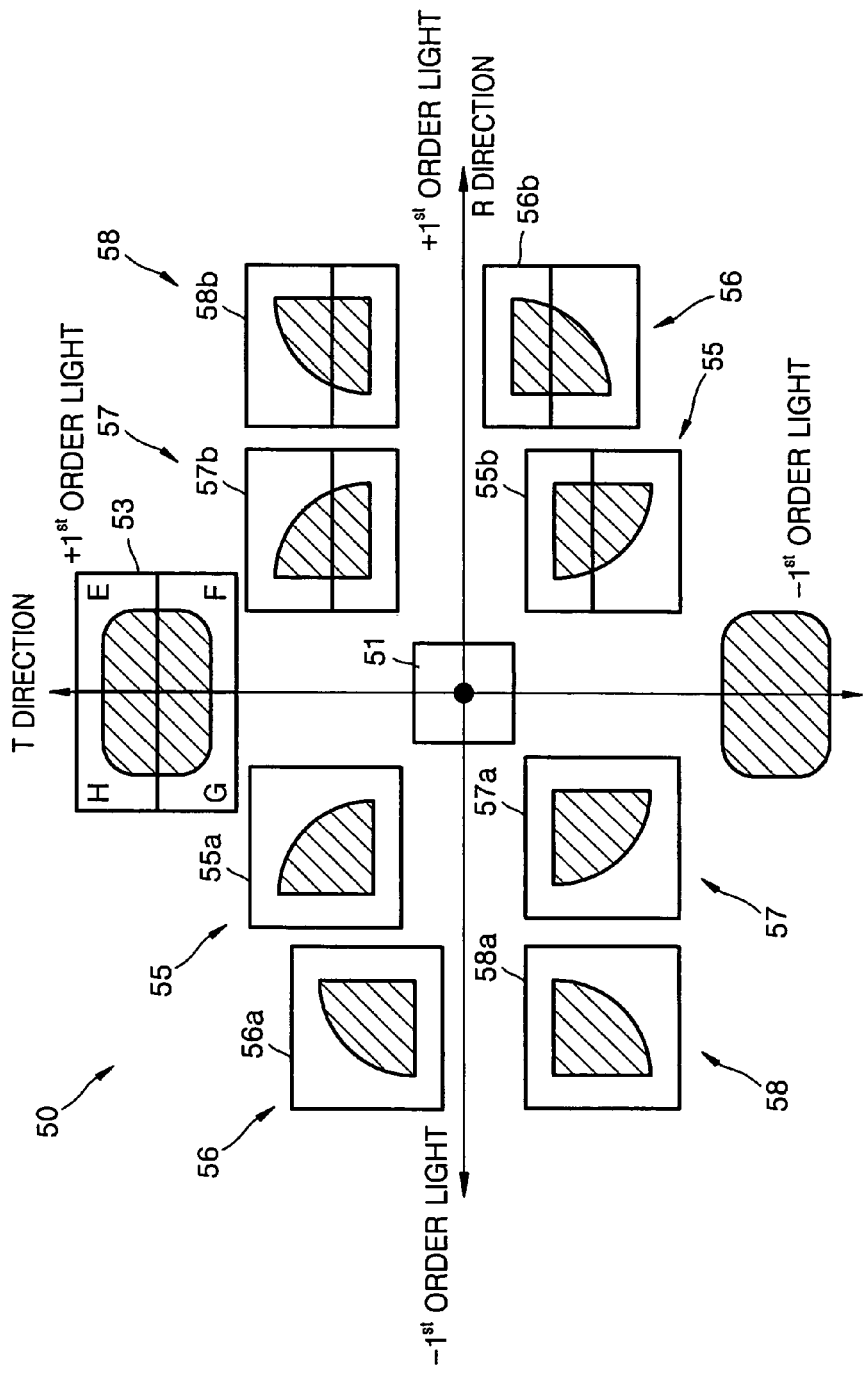
Figure 3:
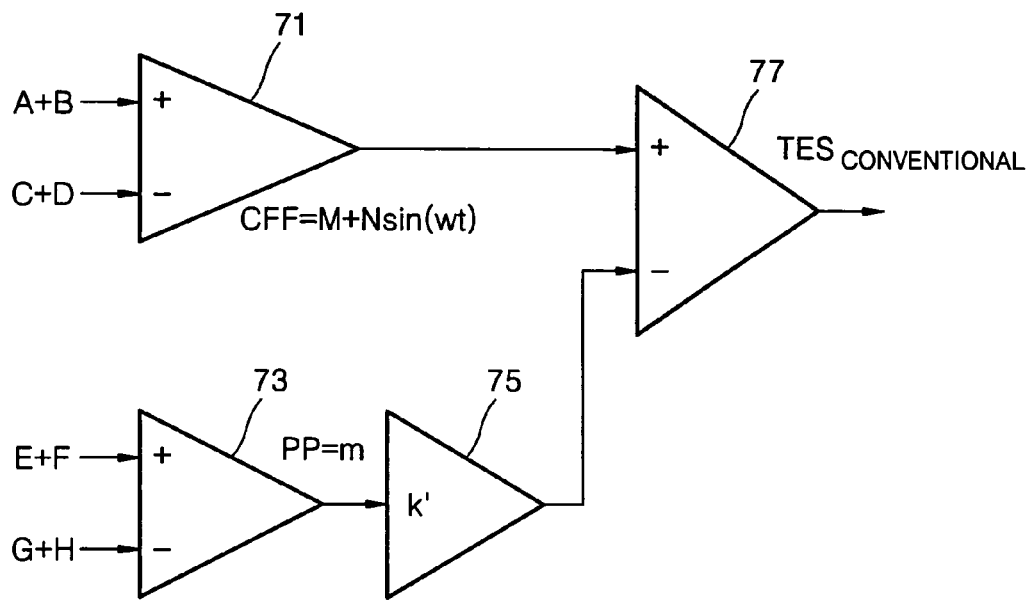
Figure 4:
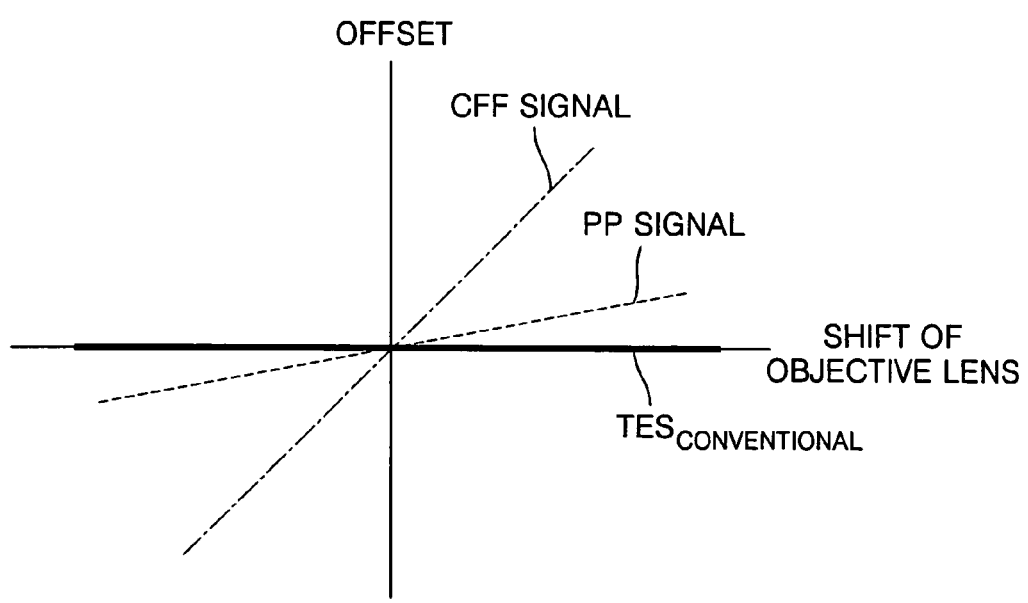
FIG. 4 illustrates offsets of a corrected far field (CFF) signal, a push-pull (PP) signal, and a tracking error signal (TES) with respect to a shift of an objective lens when a conventional tracking method disclosed in the above publication is used.
Figure 5A:
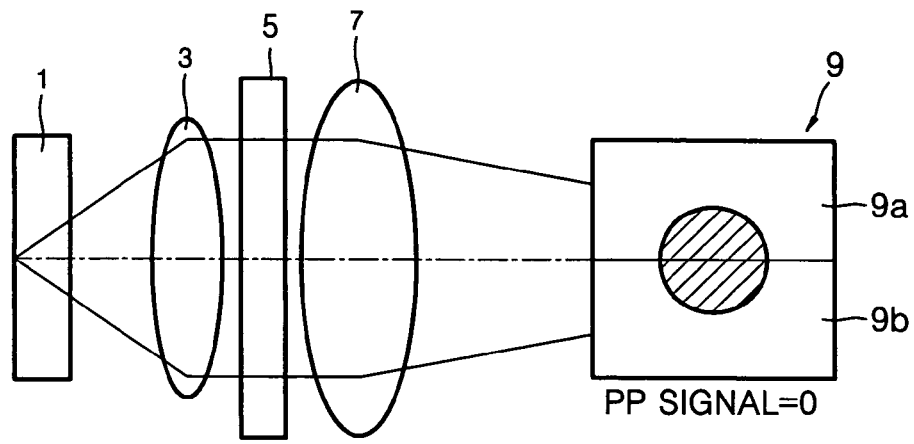
FIG. 5A illustrates light received by a photodetector when a push-pull technique is used and there is no initial photodetector balance offset.
Figure 5B:
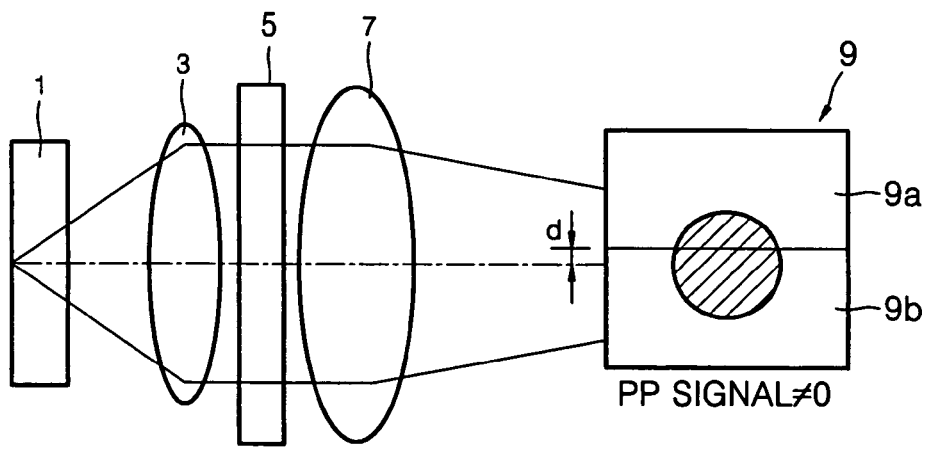
FIG. 5B illustrates light received by the photodetector when the push-pull technique is used and there is an initial photodetector balance offset.
Figure 6:
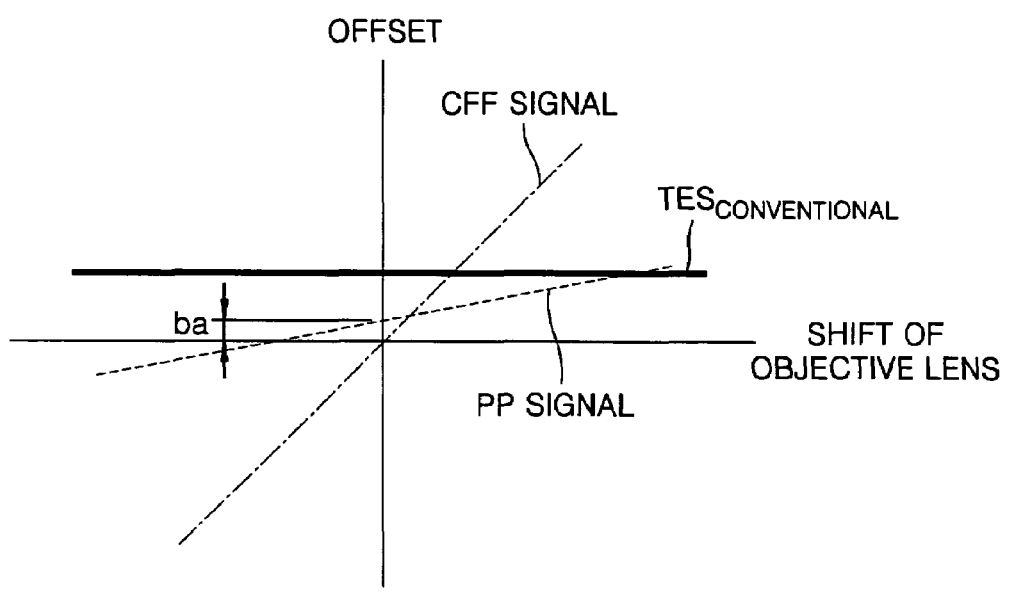
FIG. 6 illustrates offsets of a CFF signal, a PP signal, and a TES with respect to a shift of an objective lens when there is an initial photodetector balance offset and the conventional tracking method disclosed in the above publication is used.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 7A:
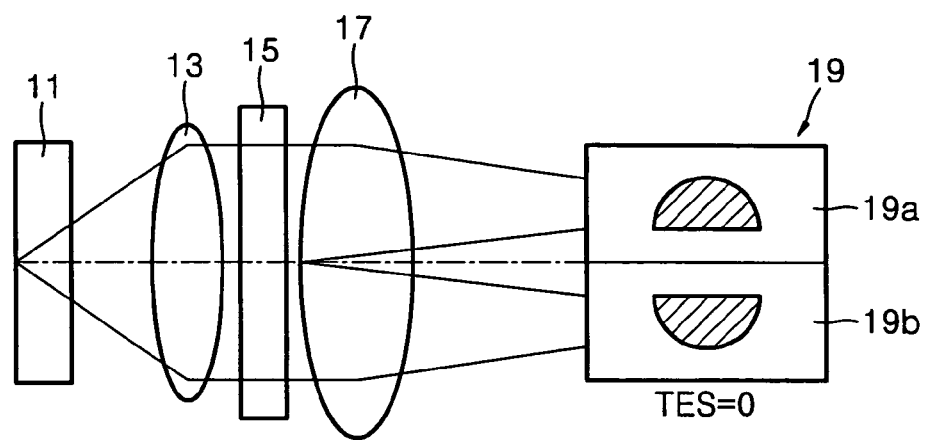
FIG. 7A illustrates light received by a photodetector when a CFF tracking method is used and there is no initial photodetector balance offset.
Figure 7B:
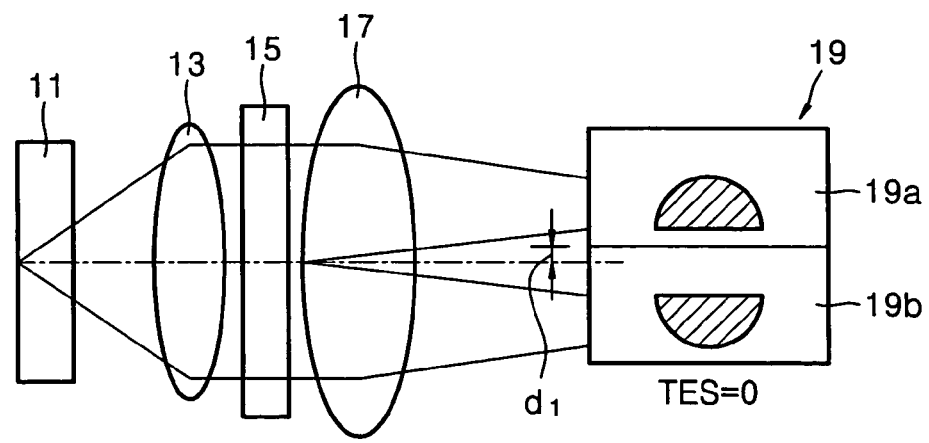
FIG. 7B illustrates light received by the photodetector when the CFF tracking method is used and there is an initial photodetector balance deviation of d1.

FIG. 7A illustrates light received by a photodetector 19 when there is no initial photodetector balance offset. FIG. 7B illustrates the shift of light received by the photodetector 19 when there is an initial photodetector balance deviation of d1. FIGS. 7A and 7B illustrate that the CFF signal is not affected by an initial photodetector balance offset when a CFF signal is detected using the CFF tracking method.

The optical system of FIGS. 7A and 7B corresponds to a part of an optical pickup that can use the CFF tracking method. The optical system of FIGS. 7A and 7B includes a hologram 15, formed to divide light reflected by a recording medium 11 into two parts, and the photodetector 19, having two light-receiving areas 19a and 19b. The hologram 15 is disposed between an objective lens 13 and a collimating lens (or a detection lens) 17.

The CFF signal is obtained by performing a signal arithmetic process identical to that in a push-pull technique on signals detected from light pre-divided by the hologram 15 and received by the light-receiving areas 19a and 19b of the photodetector 19. As can be seen from a comparison between FIGS. 7A and 7B, an offset due to the initial photodetector balance deviation does not occur in the CFF signal.

Hence, a disclosed embodiment of the present invention provides an optical pickup capable of detecting a tracking error signal using characteristics of such a CFF signal in which offsets due to a shift of an objective lens and an initial photodetector balance deviation hardly occur, and an optical recording and/or reproducing apparatus employing the optical pickup.

Although optical pickups according to the following embodiments of the present invention are designed to compatibly adopt CD-family optical discs and DVD-family optical discs, the present invention is not limited to these embodiments. In other words, features of the present invention may be applied to an optical pickup compatibly adopting a DVD-family optical disc and high-density recording media, for example, blu-ray discs (BDs), and an optical recording and/or reproducing apparatus adopting the optical pickup. Alternatively, the features of the present invention may be applied to an optical pickup for single-family optical discs.

Figure 8:
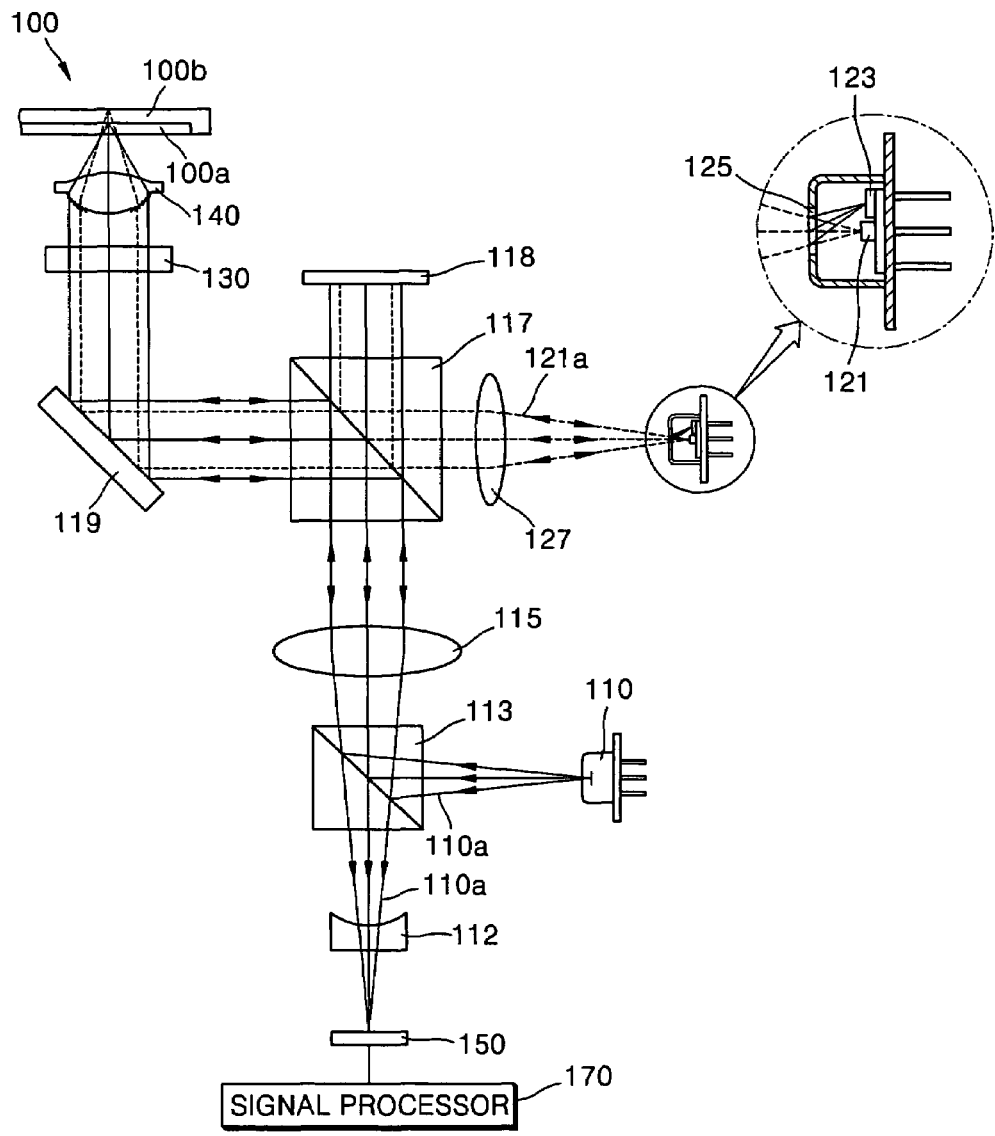
FIG. 8 schematically illustrates an optical structure of an optical pickup according to an embodiment of the present invention.

Referring to FIG. 8, an optical pickup according to an embodiment of the present invention includes a first light source 110, an objective lens 140, a diffraction unit 130, a first light path changer 113, and a first photodetector 150. The first light source 110 emits a first light 110a used to record data in and/or reproduced data from a first optical disc 100a of a specified format. The objective lens 140 focuses incident light and forms a light spot on an optical disc 100. The diffraction unit 130 divide incident first light 110a into at least 6 light parts and diffracts the at least 6 light parts. The first light path changer 113 changes a path of the first light 110a. The first photodetector 150 receives first light 110a reflected by the optical disc 100 and diffracted by the diffraction unit 130 and performs photoelectric conversion on the received first light 110a. The optical pickup according to an embodiment of the present invention further includes a second light source 121, to compatibly adopt optical discs having different formats, and a second light path changer 117. The second light source 121 emits a second light 121a used to record data in and/or reproduced data from a second optical disc 100b having a format different from the format of the first optical disc 100a. The second light path changer 117 guides paths of the first and second lights 110a and 121a.

The first and second lights 110a and 121a emitted from the first and second light sources 110 and 121 have different wavelengths. When the respective first and second optical discs 100a and 100b are of a DVD family and a CD family, respectively, the first and second lights 110a and 110b are preferably a red light suitable for DVDs (e.g., light with a 650 nm wavelength) and an infrared light suitable for CDs (e.g., light with a 780 nm wavelength), respectively.

The objective lens 140 is a lens that compatibly covers the first and second optical discs 100a and 100b.

In other words, the objective lens 140 is designed to be optimized to the wavelength of the first light 110a and a thickness of the first optical disc 100a and to have first and second numerical apertures (NAs) for the first and second lights 110a and 121a, respectively. For example, the first NA may be a 0.65 or 0.6 numerical aperture so that data is recorded on and/or reproduced from the first optical disc 100a using the first light 110a. Also, the second NA may be a 0.45 or 0.5 numerical aperture so that data is recorded on and/or reproduced from the second optical disc 100b using the second light 121a. Further, the objective lens 140 is preferably designed not to generate a spherical aberration due to a difference between thicknesses of the first and second optical discs 100a and 100b so that the first and second optical discs 100a and 100b with different thickness can be compatibly adopted.

The objective lens 140 illustrated in FIG. 8 is of a front side diffraction type including a hologram pattern on a lens surface such as to have the first and second numerical apertures for the first and second lights 110a and 121a with different wavelengths.

Instead of having a design suitable for the compatible use of the first and second optical discs 100a and 100b as described above, the objective lens 140 may be optimized for the first optical disc 100a and further include an aperture filter (not shown) for achieving the second NA required to record data on and/or reproduce data from the second light disc 100b and a phase compensator (not shown) for compensating for the spherical aberration due to the difference between the thicknesses of the first and second optical discs 100a and 100b. The aperture filter and the phase compensator may be incorporated into the diffraction unit 130.

Figure 9:
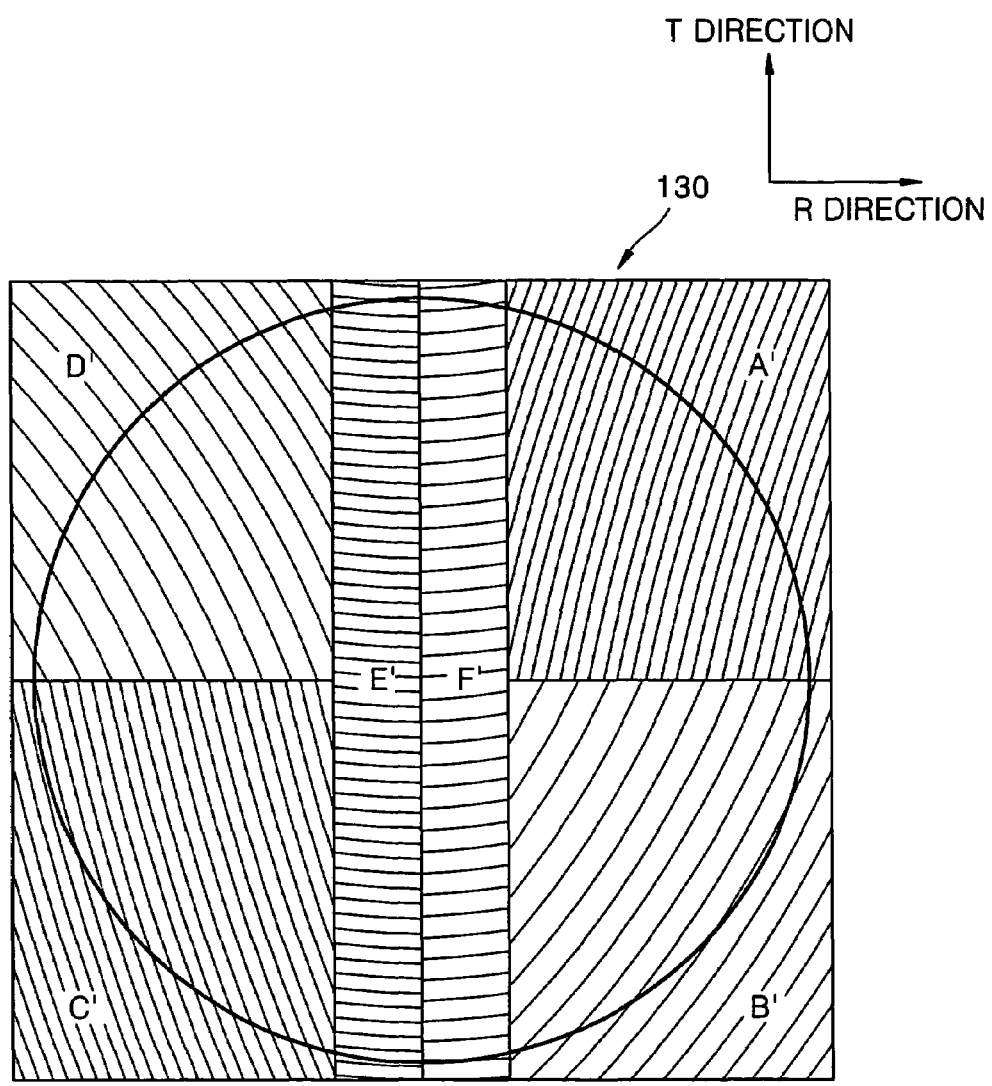
FIG. 9 is a plan view of an example of a diffraction unit used in the optical pickup according to an embodiment of the present invention.

FIG. 9 is a plan view of an example of the diffraction unit 130, which divides the first light 110a reflected by the optical disc 100 into at least 6 light areas and diffracts the at least 6 light areas. The diffraction unit 130 of FIG. 9 divides the first light 110a reflected by the optical disc 100 into 6 light areas and diffracts the 6 light areas.

Directions corresponding to radial and tangential directions of the optical disc 100 are referred to as R and T directions, respectively. With concurrent reference to FIGS. 7A-9. When the first light 110a reflected by the optical disc 100 is divided into a central light area and first and second peripheral light areas existing on both sides of the central light area in the R direction, the diffraction unit 130 includes first and second central diffraction areas E' and F' and first through fourth peripheral diffraction areas A' through D'. The first and second central diffraction areas E' and F' divide the entire central light area or a part of the central light area into two central light sub-areas in the R direction and diffract the two central light sub-areas. The first and second peripheral diffraction areas A' and B' divide the first peripheral light area into two peripheral light sub-areas in the T direction and diffract the two peripheral light sub-areas. The third and fourth peripheral diffraction areas C' and D' divide the second peripheral light area into two peripheral light sub-areas in the T direction and diffract the two peripheral light sub-areas. According to this structure, the first light 110a reflected by the optical disc 100 is divided into 6 light areas.

The first through fourth peripheral diffraction areas A' through D' are sequentially arranged clockwise (or counter-clockwise) to form a 2×2 matrix.

The first and second central diffraction areas E' and F' and the first through fourth peripheral diffraction areas A' through D' diffract the first light 110a reflected by the optical disc 100 into $\pm 1^{st}$ order lights. The first and second central diffraction areas E' and F' and the first through fourth peripheral diffraction areas A' through D' may diffract the first light 110a reflected by the optical disc 100 into $\pm 1^{st}$ order lights and zeroth order light. The diffraction unit 130 is patterned so as to maximize a diffraction efficiency of $\pm 1^{st}$ order lights and minimize a diffraction efficiency of zeroth order light, because only a $+1^{st}$ and/or $-1^{st}$ order light signal is used upon signal detection in the present embodiment as described later.

More specifically, the first and second central diffraction areas E' and F' are patterned so that the $+1^{st}$ or $-1^{st}$ order lights diffracted thereby are separated in the T direction and received by the first photodetector 150.

A hologram pattern is formed on each of the first through fourth peripheral diffraction areas A' through D' so that one of the $\pm 1^{st}$ order lights is diverged more than the zeroth order light and that the other light is converged more than the zeroth order light.

Figure 10:
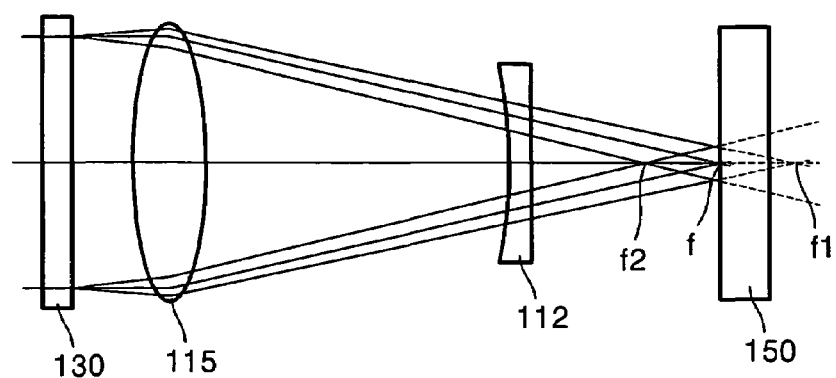
FIG. 10 illustrates different focal points of light diffracted by the diffraction unit of FIG. 9 depending on divergence and convergence characteristics of the diffracted light.

For example, the first and third peripheral diffraction areas A' and C' are designed to converge the $+1^{st}$ order light more than the zeroth order light and diverge the $-1^{st}$ order light more than the zeroth order light. The second and fourth peripheral diffraction areas B' and D' are designed to diverge the $+1^{st}$ order light more than the zeroth order light and converge the $-1^{st}$ order light more than the zeroth order light. In this case, as shown in FIG. 10, the $-1^{st}$ order light diffracted by the first and third peripheral diffraction areas A' and C' and the $+1^{st}$ order light diffracted by the second and fourth peripheral diffraction areas B' and D' are focused on a first focal point f1, and the $+1^{st}$ order light diffracted by the first and third peripheral diffraction areas A' and C' and the $-1^{st}$ order light diffracted by the second and fourth peripheral diffraction areas B' and D' are focused on a second focal point f2. The photodetector 150 is located between the first and second focal points f1 and f2, and may be located on a focal point f of the zeroth order light, in an on-focus state.

Figure 12:
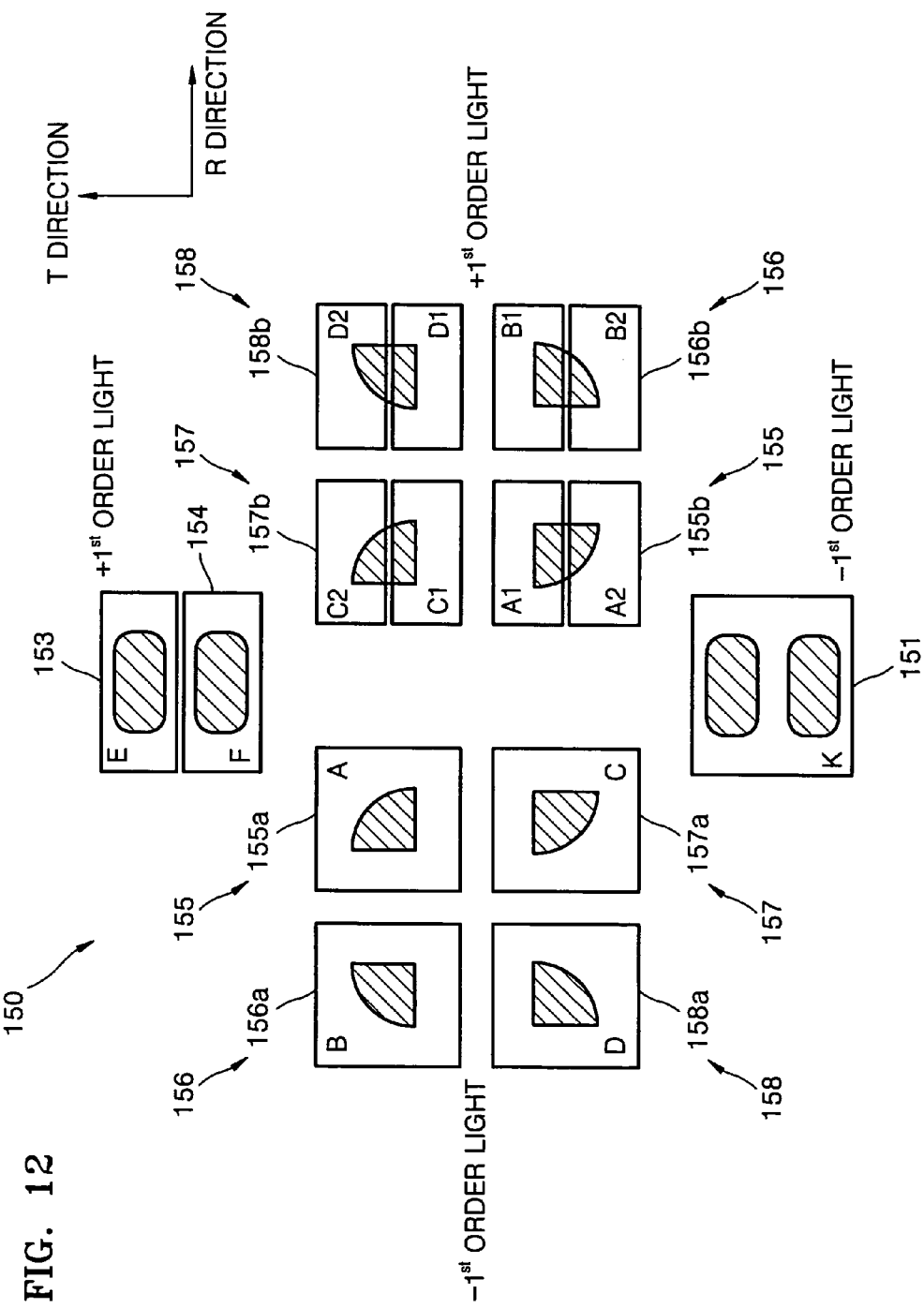
FIG. 12 is a plan view of an example of a photodetector which receives ±1$^{st}$ order light diffracted by diffraction areas of the diffraction unit of FIG. 9.

A hologram pattern is formed on each of the first and second central diffraction areas E' and F' and the first through fourth peripheral diffraction areas A' through D' so that the first light 110a reflected by the optical disc 100 is diffracted into $0^{th}$ and $\pm 1^{st}$ order lights and that the $+1^{st}$ order lights and/or the $-1^{st}$ order lights are separated from one another and received by the photodetector 150 as illustrated in FIG. 12.

The diffraction unit 130 may be disposed on a light path between the first light path changer 113 and the objective lens 140. In this case, the diffraction member 130 is a polarization hologram element to increase light efficiency.

Figure 11:
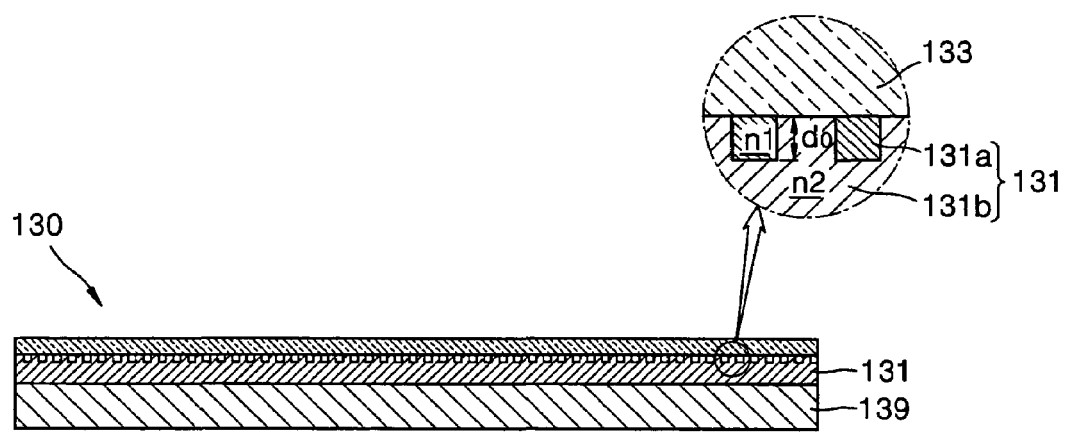
FIG. 11 is a cross-section of the diffraction unit of FIG. 9.

More specifically, as illustrated in FIG. 11, the diffraction unit 130 includes a polarization hologram layer 131 and a polarization change layer 133. The polarization hologram layer 131 selectively diffracts incident light according to polarization and wavelength thereof, and the polarization change layer 133 is installed on a side of the polarization hologram layer that faces the optical disc 100 and changes a polarization of the incident light.

As illustrated in FIG. 9 and an embodiment to be described later, the polarization hologram layer 131 is patterned to divide the first light 110a reflected by the optical disc 100 into at least 6 light areas and to diffract the at least 6 light areas.

The polarization hologram layer 131 transmits a first light 110a having one linear polarization (e.g., a P polarization) travelling from the light source 110 toward the optical disc 100 and diffracts a first light 110a having the other linear polarization (e.g., an S polarization), which is light reflected by the optical disc 100 and polarization-changed by the polarization change layer 133.

The polarization hologram layer 131 may be formed by alternating a first refractive material area 131*a* with a second refractive material area 131*b*. The polarization hologram layer 131 illustrated in FIG. 11 is obtained by periodically forming first refractive material areas 131*a* each having a thickness of d0 in a second refractive material area 131*b*. When refractive indices of the first and second refractive material areas 131*a* and 131*b* are n1 and n2, respectively, the polarization hologram layer 131 is designed such that a light path difference between lights passed through the first and second refractive material areas 131*a* and 131*b* is not a multiple of a wavelength (e.g., a 650 nm wavelength) of the first light 110*a*. The first and second refractive material areas 131*a* and 131*b* have ordinary refractive indices for the one linear polarization of the first light 111*a* received from the first light source 110 and extraordinary refractive indices for the other linear polarization (which is perpendicular to the one linear polarization) of the first light 110*a* reflected by and received from the optical disc 100.

When the diffraction unit 130 is disposed on a light path between a second light path changer 117 and the objective lens 140, and an optical pickup uses the first and second lights 110*a* and 121*a* having different wavelengths as illustrated in FIG. 8, the polarization hologram layer 131 is formed such as to diffract selectively the first light 110*a* depending on a polarization and to diffract neither the P nor S polarization of the second light 121*a*.

In other words, the polarization hologram layer 131 is designed such that a light path difference between lights passed through the first and second refractive material areas 131*a* and 131*b* is a multiple of a wavelength (e.g., a 780 nm wavelength) of the second light 121*a*.

When the polarization hologram layer 131 is designed as described above, the first light 110*a* is selectively diffracted depending on a polarization by the polarization hologram layer 131, and the second light 121*a* is not diffracted regardless of a polarization while passing through the polarization hologram layer 131.

The polarization change layer 133 is a quarter wave plate for the wavelengths of the first and second lights 110*a* and 121*a*.

When the optical pickup according to an embodiment of the present invention compatibly adopts a DVD and a BD, the polarization hologram layer 131 is designed to diffract selectively a light with a blue wavelength for BDs, for example, a 405 nm wavelength, depending on a polarization and to transmit a light with a red wavelength for DVDs, for example, a 650 nm wavelength, regardless of a polarization. The polarization change layer 133 is preferably a quarter wave plate for the wavelengths of blue light and red light.

When the above-described polarization hologram element is used as the diffraction unit 130, a polarization beam splitter is used as the light path changer 113 to increase light efficiency.

Figure 13:
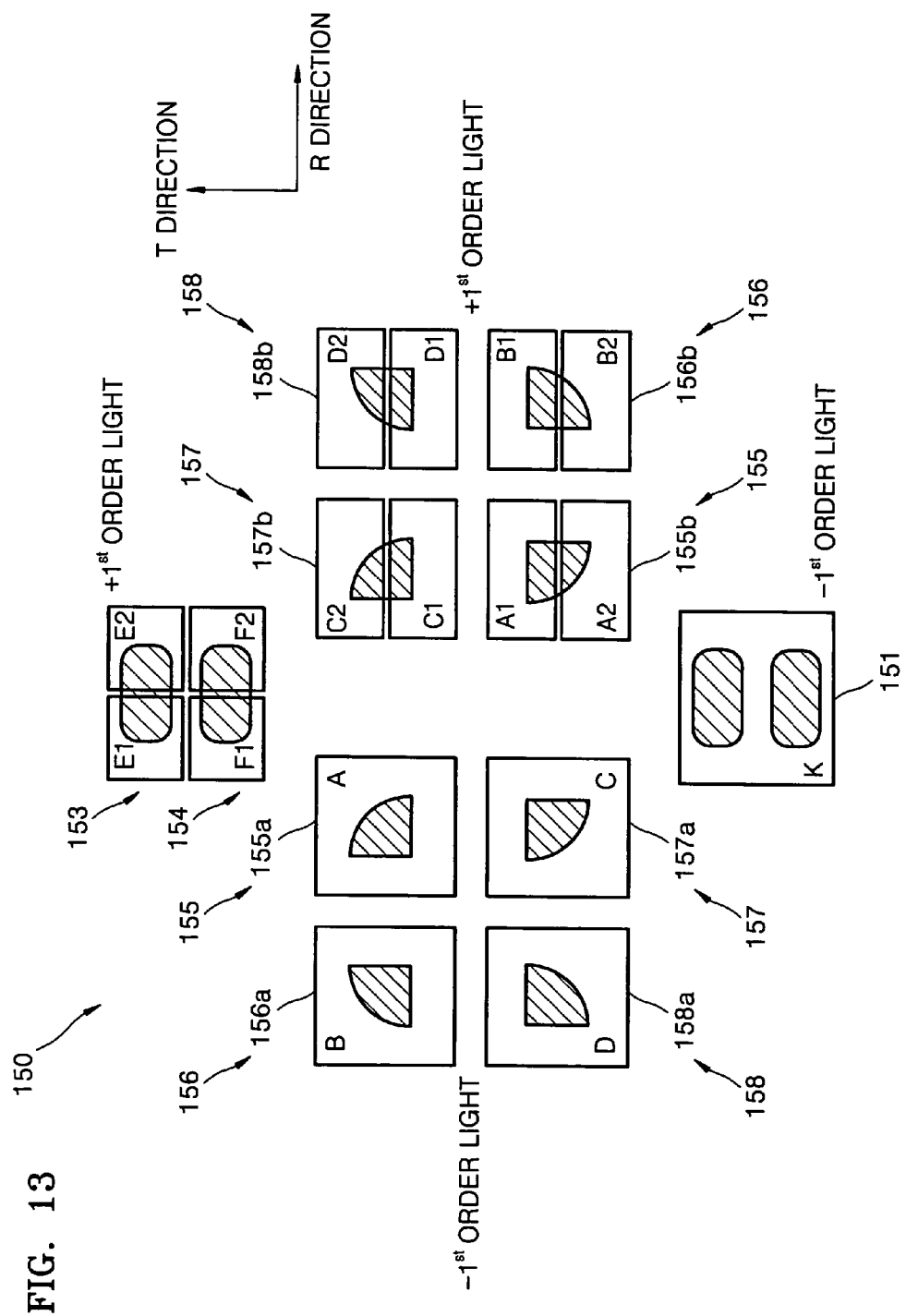
FIG. 13 is a plan view of another example of a photodetector which receives ±1$^{st}$ order light diffracted by diffraction areas of the diffraction unit of FIG. 9.

As illustrated in FIGS. 12 and 13, the photodetector 150 includes respective first through sixth light-receiving portions 153, 154, 155, 156, 157, and 158, which receive first lights 110*a* diffracted by the first and second central diffraction areas E' and F' and the first through fourth peripheral diffraction areas A' through D' of the diffraction unit 130 and perform photoelectric conversion on the received first lights 110*a*.

The first light-receiving portion 153 receives the +1$^{st}$ order light diffracted by the first central diffraction areas E', and the second light-receiving portion 154 receives the +1$^{st}$ order light diffracted by the second central diffraction areas F'.

The first and second light-receiving portions 153 and 154 are arranged in the T direction and wide in the R direction. Instead of being arranged in the T direction, the first and second light-receiving portions 153 and 154 may be arranged in the R direction due to a change in diffraction patterns of the first and second central diffraction areas E' and F'.

The first and second light-receiving portions 153 and 154 are wide in the R direction.

When the first and second light-receiving portions 153 and 154 are wide in the R direction as illustrated in FIGS. 12 and 13, it has the following advantage.

When first and second light-receiving portions 153' and 154' are formed to be wide in the T direction, a light movement due to a shift of the objective lens may affect an adjacent light-receiving portion.

Figure 14A:
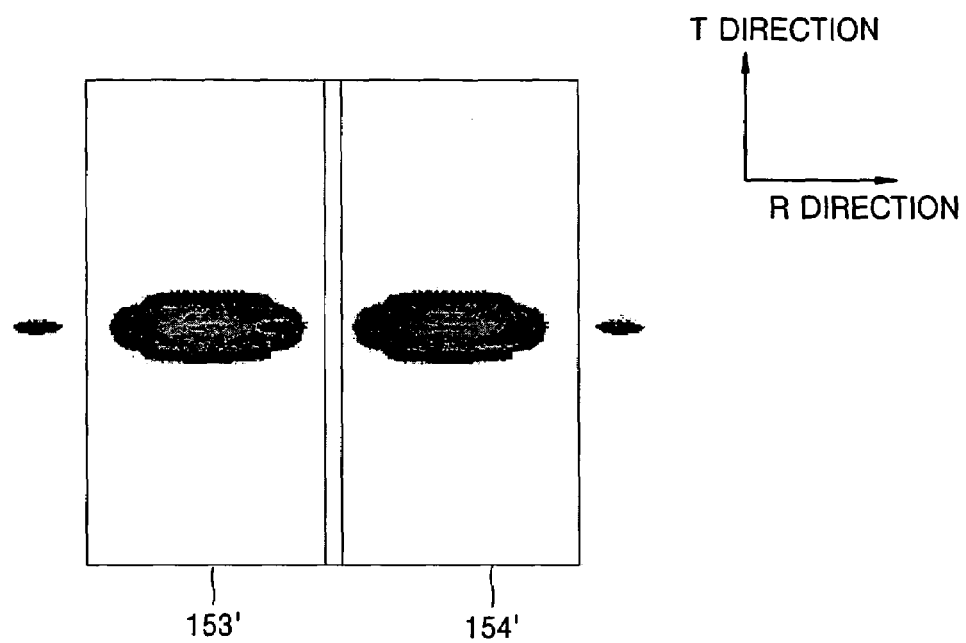
FIGS. 14A and 14B illustrate influences of lights moved due to a shift of an objective lens or the like upon adjacent first and second light-receiving portions of FIGS. 12 and 13 when the first and second light-receiving portions are wide in a T direction.

In other words, minimum widths of light beams in the R direction received by the first and second light-receiving portions 153' and 154' are decided by widths of the first and second central diffraction areas E' and F' in the R direction. Hence, when the photodetector 150 has the first and second light-receiving portions 153' and 154' narrow in the R direction and wide in the T direction, the diffraction patterns by the widths of the first and second central diffraction areas E' and F' basically affect detection signals of adjacent light-receiving portions as illustrated in FIG. 14A. For example, as illustrated in FIG. 14A, small areas of diffracted lights that are produced due to the diffraction patterns by the widths of the first and second central diffraction areas E' and F' are received by an adjacent light-receiving portion of a corresponding light-receiving portion.

Figure 14B:
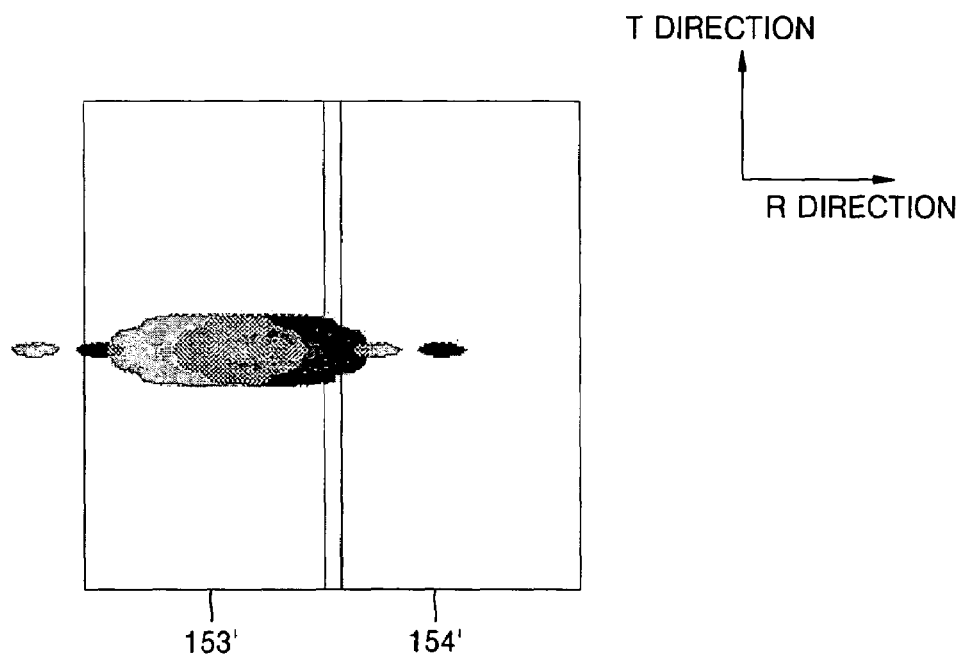

Also, when diffracted lights are moved due to a shift of an objective lens or the like as illustrated in FIG. 14B, the diffracted lights affect detection signals of light-receiving portions adjacent to corresponding light-receiving portions.

When the first and second light-receiving portions 153' and 154' are narrow in the R direction and wide in the T direction as in FIGS. 14A and 14B, a photodetector is sensitive to a photodetector balance deviation upon an assembly of an optical pickup, because a part of light may be received by a light-receiving portion adjacent to a corresponding light-receiving portion or deviate from a light-receiving area of the corresponding light-receiving portion even upon a small change of a location of the photodetector 150.

Hence, when the first and second light-receiving portions 153' and 154' are narrow in the R direction and wide in the T direction as in FIGS. 14A and 14B, influences of the diffraction patterns by the widths of the first and second central diffraction areas E' and F' cannot be avoided, and neither can an influence of a shift of an objective lens or an initial photodetector balance deviation.

Figure 14C:
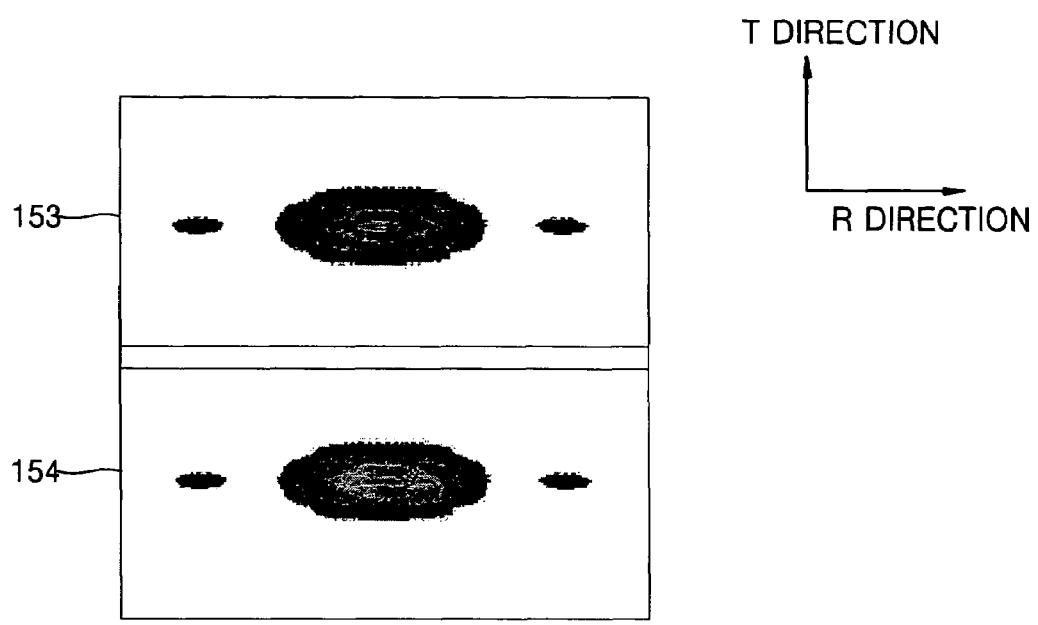
FIG. 14C illustrates non-influences of lights moved due to a shift of an objective lens or the like upon the first and second light-receiving portions of FIGS. 12 and 13 which are wide in an R direction.

On the other hand, when the first and second light-receiving portions 153 and 154 are wide in the R direction, influences of the diffraction patterns by the widths of the first and second central diffraction areas E' and F' can be avoided, and so can an influence of a shift of an objective lens or an initial photodetector balance deviation as illustrated in FIG. 14C.

As illustrated in FIG. 12, the first and second light-receiving portions 153 and 154 may include single light-receiving areas E and F, respectively. Alternatively, as illustrated in FIG. 13, the first light-receiving portion 153 may include a pair of light-receiving areas E1 and E2 arranged in the R direction, and the second light-receiving portion 154 may include a pair of light-receiving areas F1 and F2 arranged in the R direction.

The respective first and second light-receiving portions 153 and 154 may receive $-1^{st}$ order lights diffracted by the first and second central diffraction areas E' and F'.

The respective third through sixth light-receiving portions 155, 156, 157, and 158 include single light-receiving areas 155a, 156a, 157a, and 158a, respectively, which receive $-1^{st}$ order lights diffracted by the first through fourth peripheral diffraction areas A' through D' The respective third through sixth light-receiving portions 155, 156, 157, and 158 further include bisectioned light-receiving areas 155b, 156b, 157b, and 158b, respectively, which receive $+1^{st}$ order lights diffracted by the first through fourth peripheral diffraction areas A' through D' Alternatively, the bisectioned light-receiving areas 155b, 156b, 157b, and 158b may be disposed to receive the $-1^{st}$ order lights, and the respective single light-receiving areas 155a, 156a, 157a, and 158a may be disposed to receive the $+1^{st}$ order lights.

The respective bisectioned light-receiving areas 155b, 156b, 157b, and 158b are composed of inner light-receiving areas A1, B1, C1, and D1, respectively, and outer light-receiving areas A2, B2, C2, and D2, respectively. The inner light-receiving areas A1, B1, C1, and D1 receive the central area of the first light 110a, and the outer light-receiving areas A2, B2, C2, and D2 receive peripheral areas of the first light 110a.

For convenience, reference characters designating the light-receiving areas of the respective first and second light-receiving portions 153 and 154 and the respective single light-receiving areas 155a, 156a, 157a, and 158a and the respective bisectioned light-receiving areas 155b, 156b, 157b, and 158b of the respective third through sixth light-receiving portions 155, 156, 157, and 158 are also used to designate detection signals detected from the aforementioned light-receiving areas.

The photodetector 150 may also include a seventh light-receiving portion 151, which receives the $-1^{st}$ order lights diffracted by the first and second central diffraction areas E' and F' to detect an information reproduction signal from the detection signal of the received $-1^{st}$ order lights.

As will be described later, the information reproduction signal can be a sum of detection signals of the single light-receiving areas 155a, 156a, 157a, and 158a of the third through sixth light-receiving portions 155, 156, 157, and 158 and a detection signal of the seventh light-receiving portion 151.

Referring back to FIG. 8, the optical pickup further includes a second photodetector 123 and a hologram element 125 so that first and second lights 110a and 121a reflected by the first and second optical discs 100a and 100b, respectively, can be independently detected. The second photodetector 123 receives a second light 121a emitted from the second light source 123 and reflected by the optical disc 100. The hologram element 125 is installed between the second light source 121 and the second light path changer 117 and selectively diffracts an incident light. As illustrated in FIG. 8, the second light source 121, the second photodetector 123, and the hologram element 125 are preferably formed into a single optical module. The optical module may be a hologram optical module for CDs well known in the technical field of the present invention. When the optical pickup according to an embodiment of the present invention compatibly adopts BDs and DVDs, the optical module is a hologram optical module for DVDs.

The optical pickup according to an embodiment of the present invention further includes an exterior front photodetector 118 for monitoring the output of light emitted from the first and/or second light source 110 and/or 121. As illustrated in FIG. 8, the front photodetector 118 is installed on one side of the second light path changer 117 such as to be commonly used to monitor both light outputs of the first and second light sources 110 and 121. The common use of the front photodetector 118 contributes to a reduction of the number of signal lines connected to a circuit, thus decreasing the size of an optical pickup.

The second light path changer 117 is a beam splitter which reflects most of the first light 110a and transmits most of the second light 121a.

In FIG. 8, reference numeral 115 denotes a collimating lens for collimating the first light 110a emitted from the first light source 110, reference numeral 127 denotes a collimating lens for collimating the second light 121a emitted from the second light source 121, and reference numeral 112 denotes an adjusting lens disposed between the first light path changer 113 and the photodetector 150. The adjusting lens adjusts astigmatism of the first light 110a reflected by the optical disc 100 toward the photodetector 150 so as to detect a focusing error signal. Reference numeral 119 denotes a reflection mirror.

An optical recording and/or reproducing apparatus according to an embodiment of the present invention includes an optical pickup having such an optical system as described above and a signal processor 170.

The signal processor 170 may further include a circuit portion for detecting an information reproduction signal, a focusing error signal, and/or a tilt error signal in addition to a circuit system for detecting a tracking error signal. The signal processor 170 may further include a circuit portion for detecting a signal used upon optimal focus control.

Figure 15:
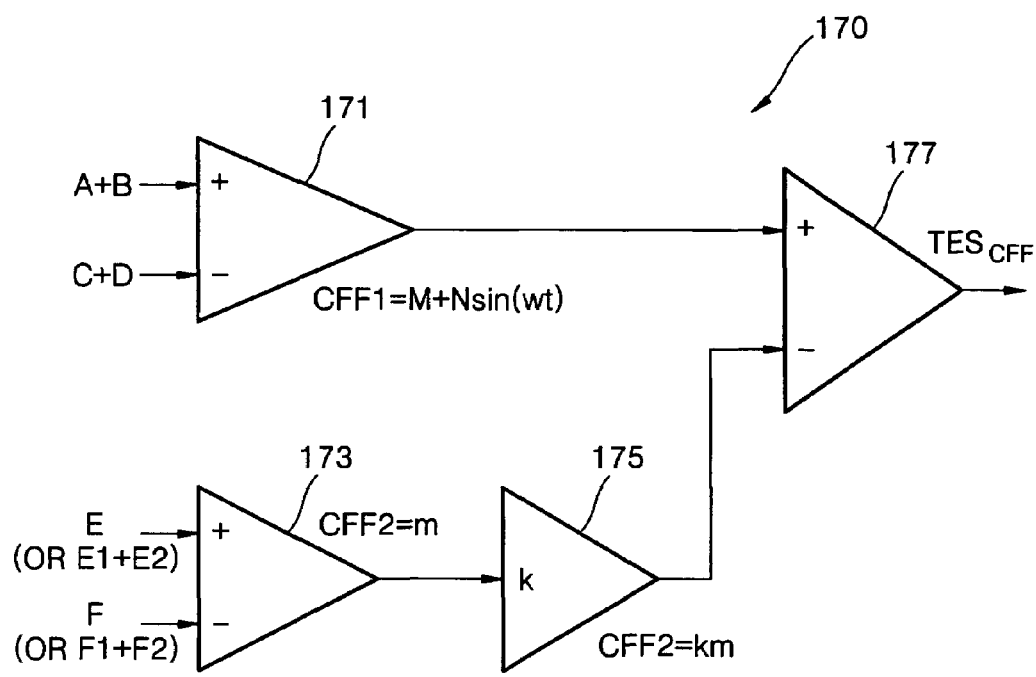
FIG. 15 is a schematic circuit diagram of a tracking error signal detection portion of a signal processor used in an optical recording and/or reproducing apparatus according to an embodiment of the present invention.

FIG. 15 is a schematic circuit diagram of a tracking error signal detection portion of the signal processor 170. A tracking error signal may be detected by subtracting a second CFF signal CFF2, obtained from the detection signals E and F (or E1, E2, F1, and F2) of the first and second light-receiving portions 153 and 154, from a first CFF signal CFF1, obtained from the detection signals A, B, C, and D of the single light-receiving areas 155a, 156a, 157a, 158a of the third through sixth light-receiving portions 155, 156, 157, and 158. The second CFF signal CFF2 is amplified by a specified gain k before being subtracted from the first CFF signal CFF1.

To detect the tracking error signal, the signal processor 170 illustrated in FIG. 15 includes respective first, second, and third subtractors 171, 173, and 177. The first subtractor 171 detects the first CFF signal CFF1 from the detection signals A, B, C, and D of the respective single light-receiving areas 155a, 156a, 157a, 158a of the respective third through sixth light-receiving portions 155, 156, 157, and 158. The second subtractor 173 detects the second CFF signal CFF2 from the detection signals E and F (or E1, E2, F1, and F2) of the first and second light-receiving portions 153 and 154. The third subtractor 177 subtracts the second CFF signal CFF2 from the first CFF signal CFF1 and outputs the tracking error signal $TES_{CFF}$. The signal processor 170 further includes a gain adjuster 175, which amplifies the second CFF signal CFF2 by the specified gain k and outputs an amplified second CFF signal CFF2 to the third subtractor 177.

As described above, when the central area of the first light 110a reflected by the optical disc 100 is previously divided into two sub-areas in the R direction like each of peripheral areas of the first light 110a, and the two central subareas are received by different light-receiving portions of the photodetector 150, a tracking error signal in which an offset is not generated much can be detected even when the objective lens 140 is shifted or when an initial photodetector balance is distorted.

In other words, when the objective lens 140 is shifted, locations of $-1^{st}$ order lights diffracted by the respective first through fourth peripheral diffraction areas A' through D' and received by the respective single light-receiving areas 155a, 156a, 157a, 158a of the third through sixth light-receiving portions 155, 156, 157, and 158 are shifted, so a specified offset M is generated in the first CFF signal CFF1. Since $+1^{st}$ order lights diffracted by the first and second central diffraction areas E' and F' of the diffraction unit 130 and received by the respective first and second light-receiving portions 153 and 154 of the photodetector 150 have already been divided by the diffraction unit 130, the second CFF signal CFF2 is insensitive to the shift of the objective lens 140 relative to the first CFF signal CFF1. Accordingly, the second CFF signal CFF2 is a DC signal having a magnitude of approximately m.

Hence, when the gain k of the gain adjuster 175 is set to be km-M=0, the third subtractor 177 outputs the tracking error signal TES$_{CFF}$, which keeps a balance regardless of a shift of the objective lens 140.

Since $-1^{st}$ order lights received by the first and second light-receiving portions 153 and 154 have already been divided by the diffraction unit 130, the second CFF signal CFF2 is almost never substantially affected by an initial balance deviation of the photodetector 150. This is because that, when light is previously divided by the first and second central diffraction areas E and F of the diffraction unit 130 before being received by the first and second light-receiving portions 153 and 154 of the photodetector 150 as in the present invention, the light can be received by effective light-receiving areas of the first and second light-receiving portions 153 and 154 even when an initial balance deviation of the photodetector 150 exists.

Accordingly, in the optical pickup according to the disclosed embodiment of present invention and the optical recording and/or reproducing apparatus adopting the same, a tracking error signal in which an offset generation due to a shift of the objective lens 140 is depressed can be detected. A tracking error signal in which an offset generation due to an initial balance deviation of the photodetector 150 is depressed can also be detected.

Figure 16:
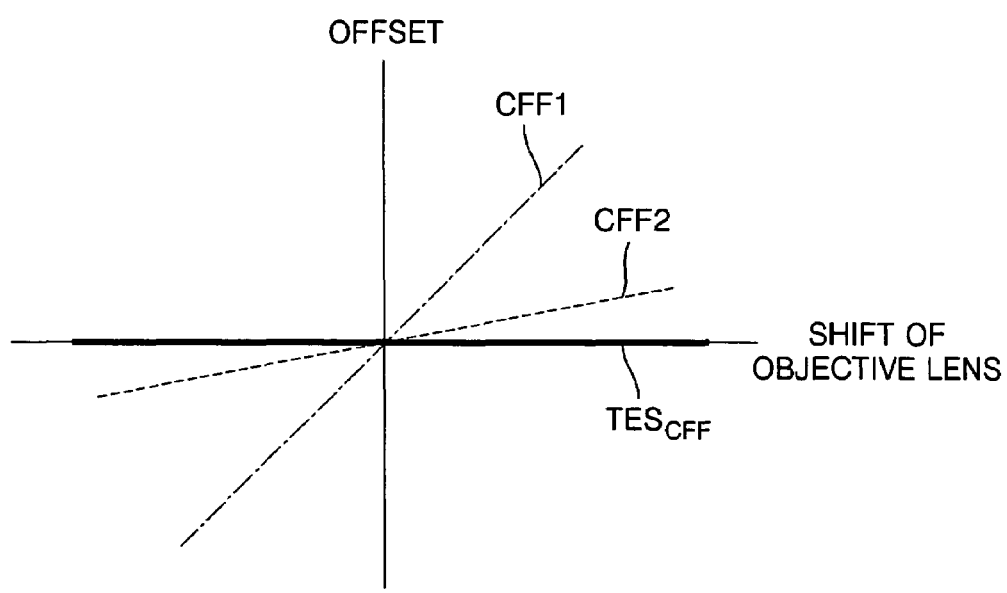
FIG. 16 is a graph illustrating offsets of first and second corrected far field (CFF) signals and a tracking error signal (TES) respectively output by first, second, and third subtractors of FIG. 15 with respect to a shift of an objective lens, when an optical pickup is used and an initial photodetector balance deviation exists.

FIG. 16 is a graph illustrating the first and second CFF signals CFF1 and CFF2 and the tracking error signal (TES) respectively output by the first, second, and third subtractors 171, 173, and 177 of FIG. 15 with respect to a shift of an objective lens, when an optical pickup according to the present invention is used and an initial photodetector balance deviation exists.

As illustrated in FIG. 16, in the present embodiment, the tracking error signal TES$_{CFF}$ is detected by using two CFF signals obtained by previously dividing the central light area by the diffraction unit 130 in contrast with a conventional method of detecting a tracking error signal by using compositely a push-pull signal and a CFF signal. Thus, thee is detected the track error signal TES$_{CFF}$, which keeps a balance regardless of a shift of an objective lens by reduced offset generation with respect to the shift of the objective lens and is depressed offset generation due to an initial photodetector balance deviation.

The detection technique of the tracking error signal TES$_{CFF}$ may be used upon recording of data on a DVD-R/DVD-RW, recording and/or reproduction of data on/from a DVD-RAM, or the like.

In an optical recording and/or reproducing apparatus according to the present embodiment, an information reproduction signal may be detected from a sum signal of signals detected from $+1^{st}$ order lights or $-1^{st}$ order lights produced by the diffraction unit 130. For example, the information reproduction signal can be diffracted by summing the detection signals A, B, C, and D of the respective single light-receiving areas 155a, 156a, 157a, and 158a of the respective third through sixth light-receiving portions 155, 156, 157, and 158 and a detection signal K of the seventh light-receiving portion 151.

When the first and second light-receiving portions 153 and 154 are each divided into two areas in the R direction as illustrated in FIG. 13, a tracking error signal may be detected using a differential phase detection technique. When the respective first and second light-receiving portions 153 and 154 are each divided into two receiving areas in the R direction, an effect where the first light 110a reflected by the optical disc 100 and incident upon the diffraction unit 130 is divided into four light areas along axes corresponding to the R and T directions and then four signals are detected from the four light areas can be obtained. More specifically, the tracking error signal can be detected by subtracting a phase of a sum signal B+D+E1+F2 from a phase of a sum signal A+C+E2+F1. The sum signal B+D+E1+F2 corresponds to a sum of detection signals of the light-receiving areas E1 and F2 of the first and second light-receiving portions 153 and 154 and the detection signals B and D of the single light-receiving areas 156a and 158a of the fourth and sixth light-receiving portions 156 and 158 with respect to light areas located in one diagonal direction. The sum signal A+C+E2+F1 corresponds to the detection signals of the light-receiving areas E2 and F1 of the first and second light-receiving portions 153 and 154 and the detection signals A and C of the single light-receiving areas 155a and 157a of the third and fifth light-receiving portions 155 and 157 with respect to light areas located in the other diagonal direction.

The tracking error signal detection using the differential phase detection technique can be used upon data reproduction from a DVD-ROM or a DVD-R/DVD-RW.

A focusing error signal (FES) is detected from the detection signals of the respective bisectioned light-receiving areas 155b, 156b, 157b, and 158b of the respective third through sixth light-receiving portions 155, 156, 157, and 158. More specifically, the FES can be calculated as in Equation 1:

$$FES=(A2+B1+C2+D1)-(A1+B2+C1+D2) \quad (1)$$

wherein A1 and A2 denote detection signals of the inner and outer light-receiving areas, respectively, of the third light-receiving portion 155, B1 and B2 denote detection signals of the inner and outer light-receiving areas, respectively, of the fourth light-receiving portion 156, C1 and C2 denote detection signals of the inner and outer light-receiving areas, respectively, of the fifth light-receiving portion 157, and D1 and D2 denote detection signals of the inner and outer light-receiving areas, respectively, of the sixth light-receiving portion 158.

Figure 17:
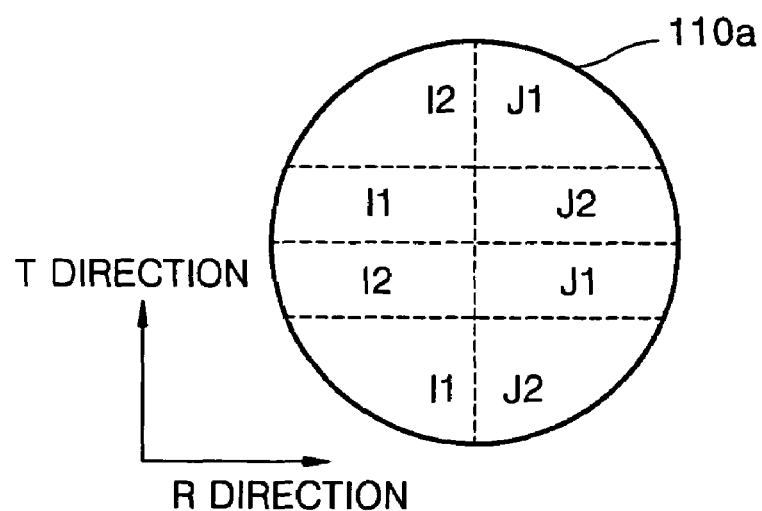
FIGS. 17 and 18 illustrate divided cross-sections of light beams to explain a principle of detecting a focusing error signal and a tilt error signal $S_{tilt}$ given by Equation 1 and 2, respectively, based on optical structures of a diffraction unit and a photodetector included in the optical pickup according to an embodiment of the present invention.

When the peripheral light area of the first light 110a reflected by the optical disc 100 is divided into 8 light sub-areas I1, I2, J1, and J2 in the R and T directions as illustrated in FIG. 17, and the reference numerals of the 8 light sub-areas are the same as those of detection signals detected from the 8 light sub-areas, the FES of Equation 1 is substantially the same as (I1−I2)+(J1−J2). For convenience, FIG. 17 omits the central light area of the first light 110a.

Since the light subareas I1 and I2 are symmetrical to each other in FIG. 17, the detection signals of the light subareas I1 and I2 have AC components of the same magnitude. The AC component is generated upon track crossing. Hence, when the detection signal I2 is subtracted from the detection signal I1, the AC components thereof are offset. The same rule is applied to the detection signals of the light subareas J1 and J2.

Thus, if an FES is calculated as in Equation 1, even when a light spot incident upon an optical disc 100 having a land/groove structure like a DVD-RAM crosses over the track of the optical disc 100 in an on focus state, the FES is not affected by the grooves of the optical disc 100.

A tilt error signal may be detected by subtracting a phase of the detection signal F or F1+F2 of the second light-receiving portion 154 from a phase of the detection signal E or E1+E2 of the first light-receiving portion 153.

The detection of the tilt error signal using differential phase detection as described above can be used upon reproduction of an optical disc 100 having pits such as a DVD-ROM.

The tilt error signal may be detected from the detection signals of the peripheral light areas of the first light 110a reflected by the optical disc 100. More specifically, the tile error signal $S_{tilt}$ can be calculated by Equation 2:

$$S_{tilt}=(A1+B1+C2+D2)-(A2+B2+C1+D1) \quad (2)$$

wherein A1 and A2 denote detection signals of the inner and outer light-receiving areas, respectively, of the third light-receiving portion 155, B1 and B2 denote detection signals of the inner and outer light-receiving areas, respectively, of the fourth light-receiving portion 156, C1 and C2 denote detection signals of the inner and outer light-receiving areas, respectively, of the fifth light-receiving portion 157, and D1 and D2 denote detection signals of the inner and outer light-receiving areas, respectively, of the sixth light-receiving portion 158.

Figure 18:
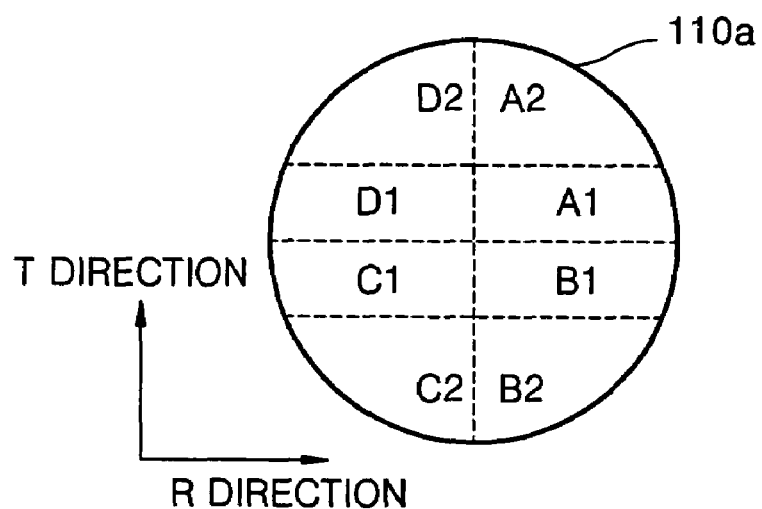

When the first light 110a reflected by the optical disc 100 are divided into 8 light sub-areas A1, B1, C1, D1, A2, B2, C2, and D2 in the R and T directions as illustrated in FIG. 18, and the objective lens 140 is tilt with respect to the optical disc 100 in a specified radial tilt direction, the light intensity of each of the light sub-areas A1, B1, C2, and D2 increases, and the light intensity of each of the light sub-areas A2, B2, C1, and D1 decreases. On the other hand, when the objective lens 140 is tilt with respect to the optical disc 100 in an opposite radial tilt direction to the predetermined radial tilt direction, the light intensity of each of the light sub-areas A1, B1, C2, and D2 decreases, and the light intensity of each of the light sub-areas A2, B2, C1, and D1 increases. For convenience sake, FIG. 18 omits the central light area of the first light 110a, and the reference numerals of the 8 light sub-areas of the first light 110a are the same as those of the bisectioned light-receiving areas of the respective third through sixth light-receiving portions 155, 156, 157, and 158 that receive the divided light sub-areas.

Since the intensity of each of the light areas A1, B1, C2, and D2 and that of each of the light areas A2, B2, C1, and D1 vary opposite to each other depending on a direction of a radial tilt as described above, a radial tilt error signal can be apparently detected by operating the detection signals detected from the light sub-areas as in Equation 2.

The detection of the tilt error signal as in Equation 2 can be applied to an optical disc 100 having grooves, for example, DVD-Rs, DVD-RWs, and DVD-RAMs.

Focusing of a light spot can be optimally controlled using a differential signal $S_{diff}$ calculated by Equation 3:

$$S_{diff}=(A+B+C+D)-(E+F) \text{ or } S_{diff}=(A+B+C+D)-(E1+E2+F1+F2) \quad (3)$$

wherein A+B+C+D denotes a sum signal of the detection signals A, B, C, and D of the respective single light-receiving areas 155a, 156a, 157a, and 158a of the respective third through sixth light-receiving portions 155, 156, 157, and 158, and E+F or E1+E2+F1+F2 denotes a sum of the detection signals E and F or a sum of detection signal E1, E2, F1, and F2 of the respective first and second light-receiving portions 153 and 154.

A differential signal $S_{diff}$ obtained as in Equation 3 is a track cross signal with respect to a track position in an on-focus state. The differential signal $S_{diff}$ is also an oscillation signal. As the degree to which a defocus increases, the oscillation of the differential signal $S_{diff}$ increases. When a location where the oscillation of the differential signal $S_{diff}$ is minimized is checked, and the light spot is focused at the checked location, the light spot can follow an optimal focusing point.

The signal processor 170 may include a circuit which detects such a differential signal $S_{diff}$ and controls an optimal focusing of a light spot using the differential signal $S_{diff}$.

When each of the first and second light-receiving portions 153 and 154 is divided into two areas in the R direction as illustrated in FIG. 13, the signal processor 170 may further include a circuit which can detect a radial centering signal for a photodetector obtained by Equation 4:

$$\text{RAD CENTERING SIGNAL}=(E1+F1)-(E2+F2) \quad (4)$$

wherein RAD CENTERING SIGNAL denotes the radial centering signal for the photodetector.

When an optical pickup according to the present embodiment adopts a photodetector having such a structure as in FIG. 13, and the signal processor 170 further includes the circuit which can detect a photodetector radial centering signal obtained by Equation 4, the position of the photodetector in the radial direction can be easily and quickly adjusted using the radial centering signal upon assembly of the optical pickup.

Figure 19:
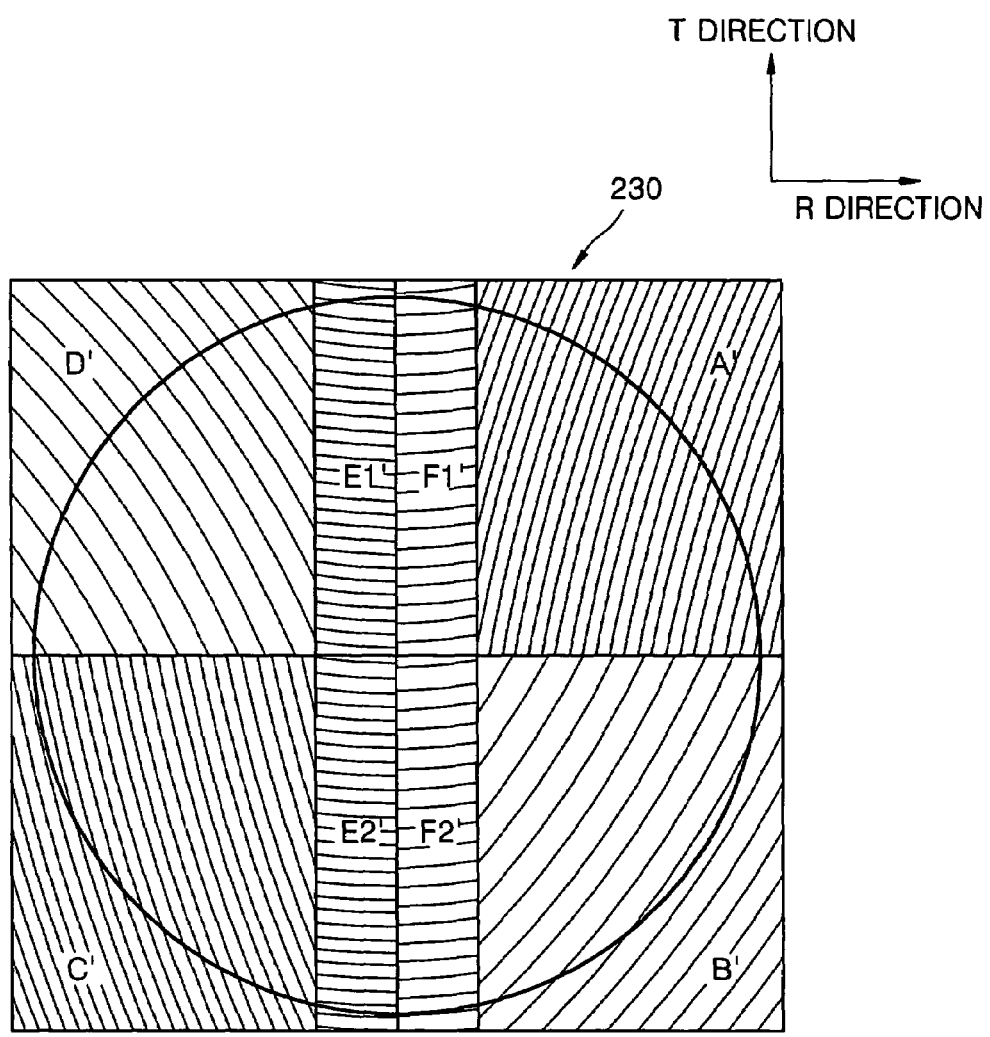
FIG. 19 a plan view of another example of the diffraction unit used in the optical pickup of FIG. 8.

Instead of including the diffraction unit 130 having first and second central diffraction areas E' and F' illustrated in FIG. 9, the optical pickup according to the present invention may include a diffraction unit 230 of FIG. 19. In this case, the photodetector of either FIG. 12 or 13 may be used.

Referring to FIG. 19, the diffraction unit 230 includes four central diffraction areas E1', E2', F1', and F2' to divide the central light area of the first light 110a into two sub-areas each in the R and T directions and four peripheral diffraction areas A', B', C', and D' to divide the peripheral light area thereof. The diffraction patterns of the four peripheral diffraction areas A', B', C', and D' and the division of a light area are the same as those of the diffraction unit 130 of FIG. 9, so they will not be described here.

The central diffraction areas E1' and E2' are two parts into which the first central diffraction area E' of FIG. 9 is divided in the T direction, and the central diffraction areas F1' and F2' are two parts into the second central diffraction area F' of FIG. 9 is divided in the T direction.

−1$^{st}$ order lights diffracted by the central diffraction areas E1' and E2' are received by the first light-receiving portion 153 of FIG. 12 or 13. −1$^{st}$ order lights diffracted by the central diffraction areas F1' and F2' are received by the second light-receiving portion 154 of FIG. 12 or 13.

Figure 20:
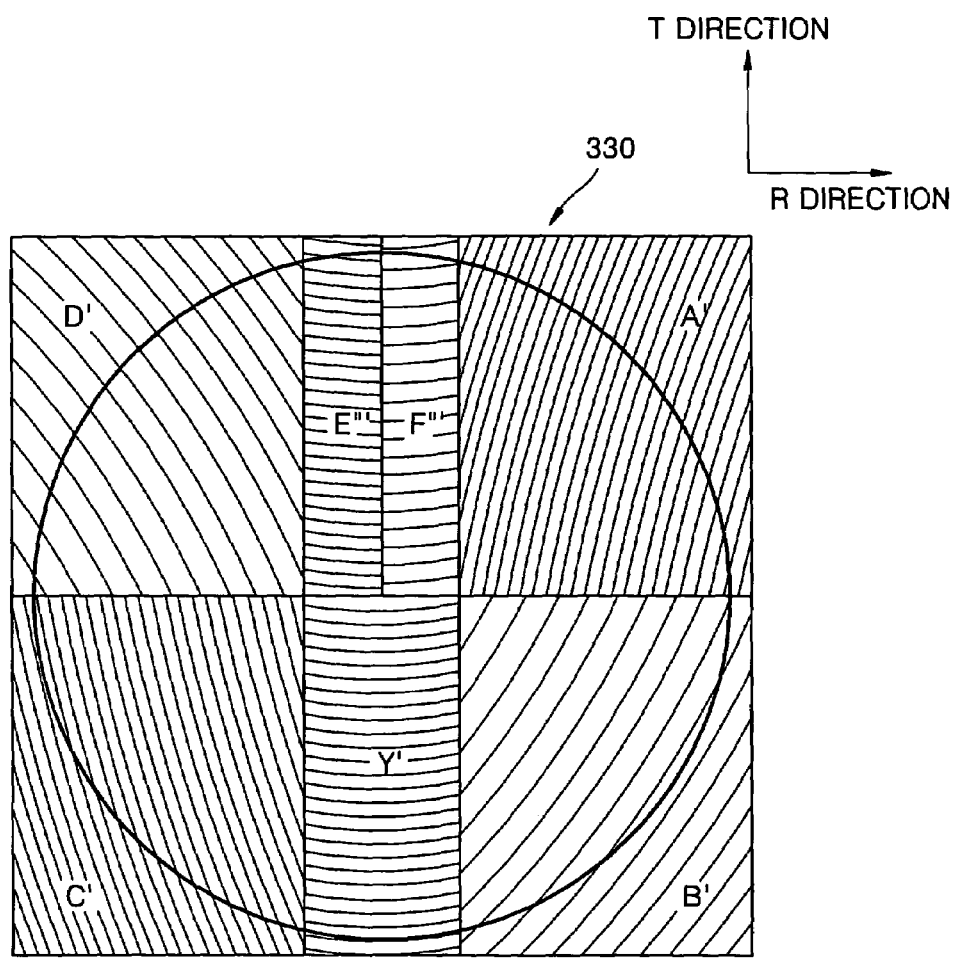
FIGS. 20 and 21 are plan views of still other examples of the diffraction unit and the photodetector, respectively, included in the optical pickup according to an embodiment of the present invention.
Figure 21:
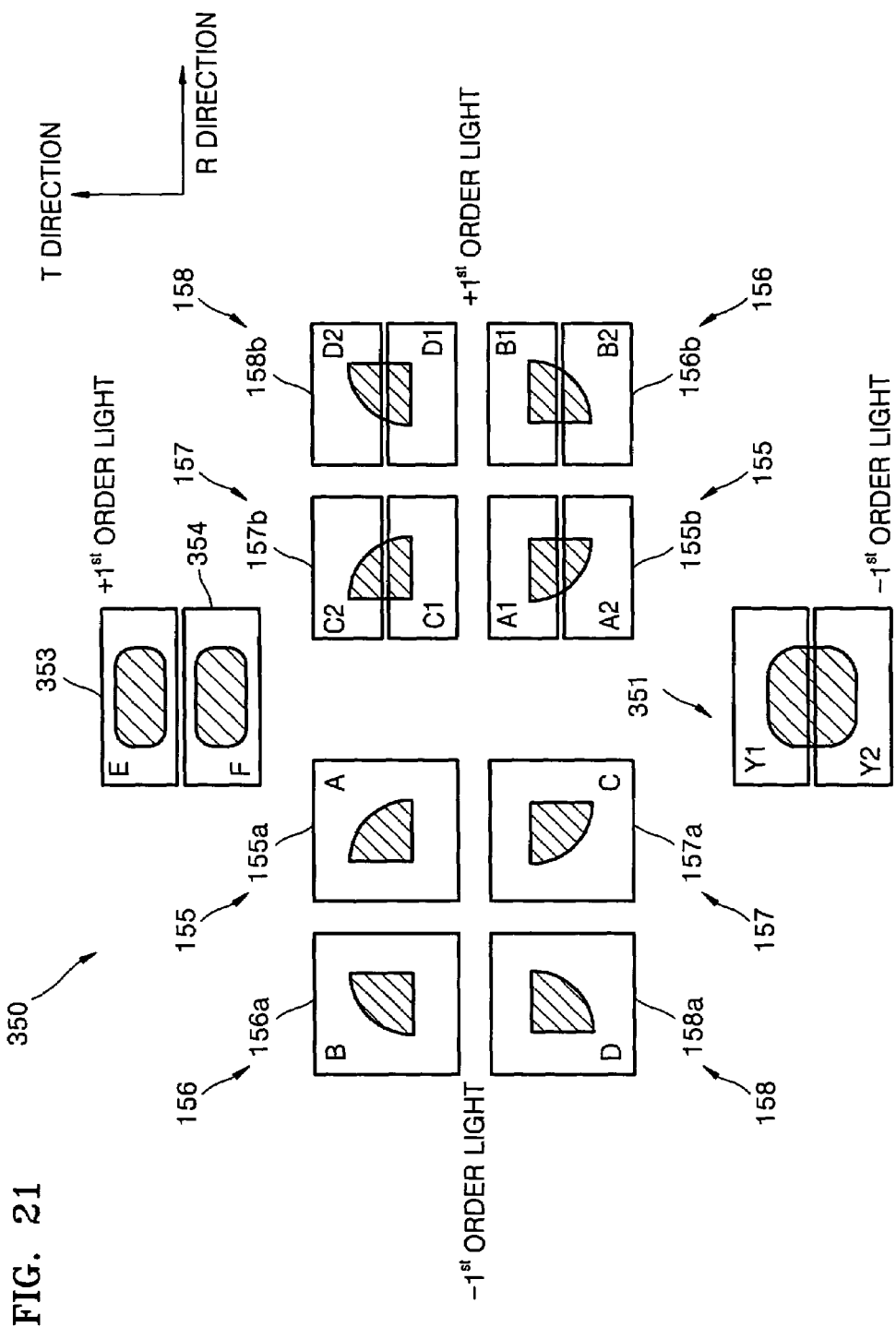

The optical pickup according to the present embodiment may include a diffraction unit 330 of FIG. 20 and a photodetector 350 of FIG. 21. Like elements having substantially the same functions as those in the previous embodiments are designated by like reference characters and like reference numerals, and their description will be omitted.

Referring to FIG. 20, the diffraction unit 330 includes first and second central diffraction areas E''' and F''', which divide a part of the central light area of a light beam into two central light sub-areas in the R direction and diffract the two central light sub-areas, and a third central diffraction area Y', which diffracts the remaining part of the central light area.

Referring to FIG. 21, +1$^{st}$ order lights diffracted by the central diffraction areas E''' and F''' are received by first and second light-receiving portions 353 and 354, respectively. In FIG. 21, the first and second light-receiving portions 353 and 354 include single light-receiving areas E and F, respectively, as in FIG. 12. Alternatively, the first and second light-receiving portions 353 and 354 may include a pair of light-receiving areas E1 and E2 and a pair of light-receiving areas F1 and F2, respectively, as in FIG. 13.

A −1$^{st}$ order light diffracted by the third central diffraction areas Y' is received by a seventh light-receiving portion 351. Here, the seventh light-receiving portion 351 may be disposed to receive a +1$^{st}$ order light diffracted by the third central diffraction areas Y'.

As shown in FIG. 21, the seventh light-receiving portion 351 includes a pair of light-receiving areas Y1 and Y2 arranged in the T direction.

Diffracted lights not used upon signal detection, which are zeroth order light, −1$^{st}$ order lights diffracted by the central diffraction areas E'' and F'', and a +1$^{st}$ order light diffracted by the third central diffraction areas Y', are not shown in FIG. 21.

When the seventh light-receiving portion 351 includes the light-receiving areas Y1 and Y2 arranged in the T direction as illustrated in FIG. 21, a tangential centering signal of a photodetector can be detected.

Hence, when the optical pickup according to the present embodiment includes the diffraction unit 330 of FIG. 20 and the photodetector 350 of FIG. 21, the signal processor 170 preferably further includes a circuit capable of detecting a tangential centering signal of the photodetector 350 calculated by Equation 5:

TAN CENTERING SIGNAL=Y1−Y2    (5)

wherein TAN CENTERING SIGNAL denotes a tangential centering signal of a photodetector.

The optical pickup according to the present embodiment may include the diffraction unit 230 of FIG. 19 and the photodetector 350 of FIG. 21. In this case, diffraction patterns are formed on the central diffraction areas E2' and F2' so that the lights diffracted thereby are received by the seventh light-receiving portion 351.

As described above, the optical pickup according to the present embodiment can detect a focusing error signal, a tilt error signal, an optimal focus control signal, and the like, including a tracking error signal detected by optimally utilizing a CFF tracking method depending on a type of the first optical disc 100a. Thus, when the optical pickup according to the present embodiment further includes the signal processor 170, which can detect at least one of the reproduction signal as described above, the error signals as described above, and the optimal focus control signal, including the tracking error signal by adaptively using the CFF tracking method, and a tracking, focusing, and/or tilting servo is controlled using these detected signals, conventional problems are solved, such that stable recording and/or reproduction of an information signal can be achieved.

An operation of the optical pickup according to the present embodiment will now be described with reference to FIGS. 8, 9, 11, and 12. First, when the first optical disc 100a, for example, a DVD-ROM, a DVD-R, a DVD-RW, or a DVD-RAM, is loaded in an optical recording and/or reproducing apparatus employing the optical pickup according to the embodiment invention, the first light source 110 is driven to emit the first light 110a. One linear polarization component (e.g., a P polarization component) of the first light 110a is reflected by the first light path changer 113 and incident upon the diffraction unit 130 via the second light path changer 117. The first light 110a incident upon the diffraction unit 130 passes through the diffraction unit 130 and is focused by the objective lens 140 to form a light spot on a recording surface of the first optical disc 110a. More specifically, the first light 110a incident upon the diffraction unit 130 passes through the polarization hologram layer 131 and is changed to light having one circular polarization while passing through the polarization change layer 133. A first light 110a reflected by the recording surface of the first optical disc 100a is re-incident upon the diffraction unit 130 via the objective lens 140. While being reflected by the recording surface of the first optical disc 100a, the first light 110a is changed to a light having the other circular polarization orthogonal to the one circular polarization. The first light 110a having the other circular polarization incident upon the diffraction unit 130 is changed to a light having the other linear polarization component (e.g., an S polarization component), which is orthogonal to the light having one linear polarization component, while passing through the polarization change layer 133. The light having the other linear polarization is diffracted by the polarization hologram layer 131, such that the light is divided into 6 light areas and at the same time, is split into zeroth and ±1$^{st}$ order lights. The zeroth and ±1$^{st}$ order lights are incident upon the first light path changer 113 via the second light path changer 117, passes through the first light path changer 113, and is received by the photodetector 150. The signal processor 170 detects a reproduction signal and/or a signal used to control a focusing, tracking, and/or tilting servo according to the above-described principle by using the signal output from the photodetector 150.

When the second optical disc 110b, for example, a CD-ROM, a CD-R, or a CD-RW, is loaded in the optical recording and/or reproducing apparatus employing the optical pickup according to the present invention, the second light source 121 is driven to emit the second light 121a. The second light 121a is transmitted straight by the hologram element 127 and incident upon the diffraction unit 130 via the second light path changer 117. The second light 121a incident upon the diffraction unit 130 passes through the polarization hologram layer 131 and is focused by the objective lens 140 to form a light spot on a recording surface of the second optical disc 100b. A second light 121a reflected by the recording surface of the second optical disc 100b is re-incident upon the second light path changer 117 along a path opposite to the above-described path and then upon the hologram element 125. The second light 121a is diffracted by the hologram element 125 and received by the photodetector 150.

The optical pickup according to the present embodiment is suitable for a compatible optical recording and/or reproducing apparatus for DVD-RAMs. The optical recording and/or reproducing apparatus adopting the optical pickup according to the present invention may compatibly use all kinds of DVD-family optical discs and all kinds of CD-family optical discs.

Although the optical pickup according to the present embodiment having the optical configuration of FIG. 8 has been described above, an optical pickup according to another embodiment of the present invention may be provided, compatibly adopting DVD-family optical discs and next-generation DVD-family optical discs. In this alternative embodiment, the first light source 110 emits a light in a blue wavelength range suitable for next-generation DVD-family optical discs, and the second light source 121 emits a light in a red wavelength range suitable for the DVD-family optical discs 100. Also, the remaining optical elements of the optical pickup are adequately changed according to a design condition corresponding to the alternative optical pickup compatibly adopting DVD-family optical discs and next-generation DVD-family optical discs. When this alternative optical pickup further includes a diffraction unit for the second light 121a in addition to the diffraction unit 130 and has the photodetector 150 without change, data can be stably recorded in and/or reproduced from DVD-family optical discs as well as next-generation DVD-family optical discs.

An optical pickup according to still another embodiment of the present invention adopting single-family optical discs may be provided, which is obtained by removing the second light source 121, optical elements dependent on the second light source 121, and the second light path changer 117 from the optical pickup of FIG. 8 and disposing the front photodetector 118 at one side of the first light path changer 113. The wavelength of light emitted from the first light source 110 and the remaining optical elements are reconstructed according to a design condition conforming to the format of the DVD-family or next-generation DVD-family optical disc 100.

Figure 22:
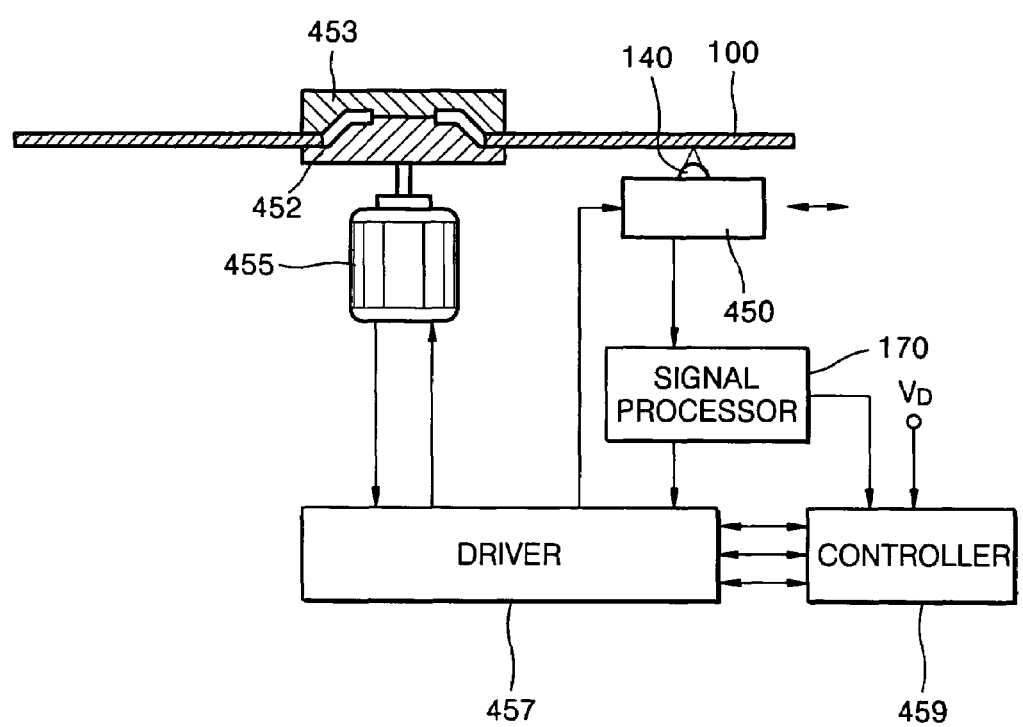
FIG. 22 is a schematic diagram of a structure of an optical recording and/or reproducing apparatus according to an embodiment of the present invention.

FIG. 22 is a schematic diagram of a structure of an optical recording and/or reproducing apparatus adopting an optical pickup according to an embodiment of the present invention. Referring to FIG. 22, the optical recording and/or reproducing apparatus includes a spindle motor 455 for rotating the optical disc 100, an optical pickup 450 installed such as to move in a radial direction of the optical disc 100, for recording data on or reproducing data from the optical disc 100, a driver 457 for driving the spindle motor 455 and the optical pickup 450, the signal processor 170 for detecting various signals including a tracking error signal from detection signals of a photodetector (not shown) included in the optical pickup 450, and a controller 470 for controlling a focusing servo, a tracking servo, and the like of the optical pickup 450 using a signal calculated in the signal processor 170. Reference numeral 452 denotes a turntable, and reference numeral 453 denotes a clamp for chucking the optical disc 100.

The optical pickup 450 has the same optical system structure as that of the optical pickup according to the present invention as described above. The signal processor 170 is a circuit designed to detect various signals including the tracking error signal as described above.

Light reflected by the optical disc 100 is detected and changed to an electrical signal by the photodetector of the optical pickup 450. The electrical signal is operated by the signal processor 170 and received by the controller 459. The driver 457 controls a rotating speed of the spindle motor 455, amplifies a received signal, and drives the optical pickup 450. The controller 459 sends a focusing servo command and a tracking servo command, which are adjusted based on a signal received from the signal processor 170, to the driver 457 to perform focusing and tracking operations of the optical pickup 450.

In the optical recording and/or reproducing apparatus, even when an initial photodetector balance is distorted, generation of an offset in a tracking error signal due to the initial photodetector balance deviation is depressed.

When a light reflected by an optical disc is divided into a central light area and peripheral light areas at both sides of the central light area, the entire central light area or a part of the central light area is divided into two sub-areas by a diffraction unit and then received by a photodetector. Hence, a tracking error signal whose offset generation due to a shift of an objective lens is insensitive and whose offset generation due to an initial photodetector balance deviation is depressed may be detected. Also, the amount of offset generated in the tracking error signal does not nearly vary upon a switch between recording and reproduction or a switch between recorded and unrecorded areas. Thus, excellent recording and/or reproduction of an information signal can be achieved.

Further, an optical pickup according to the present invention can detect a radial and/or tangential centering signal of a photodetector, such that the use of the radial and/or tangential centering signal facilitates an adjustment of a position of the photodetector upon an assembly of the optical pickup.

Although embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. An optical pickup comprising:
a first light source emitting a first light with a wavelength;
a first light path changer changing a traveling path of the first light;
an objective lens focusing the first light and forming a light spot on a recording medium;
a diffraction unit including:
first and second central diffraction areas which divide at least a part of a central light area into two sub-areas in a first direction and diffract light to the two sub-areas;
first and second peripheral diffraction areas which divide a first peripheral light area into two sub-areas in a second direction and diffract light to the two sub-areas; and
third and fourth peripheral diffraction areas which divide a second peripheral light area into two sub-areas in a second direction and diffract light to the two sub-areas, the diffraction unit dividing the first light reflected by the recording medium into at least 6 light areas and diffracting the at least 6 light areas; and a first photodetector including:
  first and second light-receiving portions receiving the first light diffracted into a $+1^{st}$ or $-1^{st}$ order light by the first and second central diffraction areas and converting the first light into an electrical signal; and
  third through sixth light-receiving portions receiving a $+1^{st}$ order light and/or a $-1^{st}$ order light diffracted by the first through fourth peripheral diffraction areas,
wherein the first direction is a radial direction and the second direction is a tangential direction
wherein the first light reflected by the recording medium is divided into the central light area and the first peripheral light area and the second peripheral light area, and
wherein the first and second peripheral light areas are at respective sides of the central light area.

2. The optical pickup of claim 1, wherein each of the first and second central diffraction areas is one of a single diffraction area and a pair of diffraction areas arranged in the second direction.

3. The optical pickup of claim 2, wherein:
  the first light-receiving portion receives light diffracted by the first central diffraction area and includes one of a single light-receiving area and a pair of light-receiving areas arranged in the first direction; and
  the second light-receiving portion receives light diffracted by the second central diffraction area and includes one of a single light-receiving area and a pair of light-receiving areas arranged in the first direction.

4. The optical pickup of claim 1, wherein:
  the first and second central diffraction areas divide a part of the central light area into two sub-areas in the first direction and diffract the two sub-areas; and
  the diffraction unit includes a third central diffraction area diffracting the remaining part of the central light area.

5. The optical pickup of claim 4, wherein:
  the first light-receiving portion receives light diffracted by the first central diffraction area and includes one of a single light-receiving area and a pair of light-receiving areas arranged in the first direction;
  the second light-receiving portion receives light diffracted by the second central diffraction area and includes one of a single light-receiving area and a pair of light-receiving areas arranged in the first direction; and
  the first photodetector includes a seventh light-receiving portion receiving light diffracted by the third central diffraction area and including one of a single light-receiving area and a pair of light-receiving areas arranged in the second direction.

6. The optical pickup of claim 5, wherein the first light transmits an information reproduction signal which is a sum signal of signals detected from $+1^{st}$ or $-1^{st}$ order lights received by the third through sixth light-receiving portions and a signal detected from a $+1^{st}$ or $-1^{st}$ order light received by the seventh light-receiving portion.

7. The optical pickup of claim 1, wherein each of the first and second light-receiving portions is wide in the first direction.

8. The optical pickup of claim 7, wherein:
  the first and second light-receiving portions are arranged in the second direction; and
  patterns are formed on the first and second central diffraction areas so that the $+1^{st}$ or $-1^{st}$ order lights diffracted by the first and second central diffraction areas are received by the first and second light-receiving portions.

9. The optical pickup of claim 1, wherein patterns are formed on the first through fourth peripheral diffraction areas so that one of the $+1^{st}$ and $-1^{st}$ order lights diffracted by the first through fourth peripheral diffraction areas is diverged relatively to a zeroth order light and that the other light is converged relatively to the zeroth order light.

10. The optical pickup of claim 9, wherein:
  the first through fourth peripheral diffraction areas are sequentially arranged clockwise or counterclockwise;
  the $-1^{st}$ order lights diffracted by the first and third peripheral diffraction areas and the $+1^{st}$ order lights diffracted by the second and fourth peripheral diffraction areas are focused at a first focal point, and the $+1^{st}$ order lights diffracted by the first and third peripheral diffraction areas and the $-1^{st}$ order lights diffracted by the second and fourth peripheral diffraction areas are focused at a second focal point; and
  the first photodetector is located between the first and second focal points in an on-focus state.

11. The optical pickup of claim 1, wherein the wavelength of the first light is a first wavelength and the optical pickup further comprises a second light source emitting a second light having a second wavelength different from the first wavelength, the first and second wavelengths being usable with recording media of different respective formats.

12. The optical pickup of claim 11, wherein one of the first and second lights is in an infrared wavelength range suitable for recording data in and/or reproducing data from a CD-family recording medium, and the other light is in a red wavelength range suitable for recording data in and/or reproducing data from a DVD-family recording medium.

13. The optical pickup of claim 11, wherein the diffraction unit is disposed between the first light path changer and the objective lens and includes:
  a polarization hologram layer selectively diffracting the first light according to a polarization of the first light so that a first light traveling from the first light source toward a recording medium is transmitted and a first light reflected by the recording medium is diffracted and transmitting the second light; and
  a polarization change layer formed on a side of the polarization hologram layer that faces the recording medium, changing a polarization of an incident light.

14. The optical pickup of claim 1, wherein the diffraction unit is disposed between the first light path changer and the objective lens and includes:
  a polarization hologram layer transmitting the first light traveling from the first light source toward a recording medium and diffracting the first light reflected by the recording medium; and
  a polarization change layer formed on a side of the polarization hologram layer that faces the recording medium, changing the polarization of the incident light.

15. An optical recording and/or reproducing apparatus comprising:
  an optical pickup emitting light onto a recording medium and receiving light reflected by a recording surface of the recording medium; and
  a signal processor detecting a tracking error signal and/or a centering signal of a photodetector,
  wherein the optical pickup includes:
    a first light source emitting a first light with a wavelength;
    a first light path changer changing a traveling path of the first light; and
    an objective lens focusing the first light and forming a light spot on a recording medium;

a diffraction unit including:
first and second central diffraction areas which divide at least a part of a central light area into two sub-areas in a first direction and diffract the two sub-areas;
first and second peripheral diffraction areas which divide a first peripheral light area into two sub-areas in a second direction and diffract the two sub-areas; and
third and fourth peripheral diffraction areas which divide a second peripheral light area into two sub-areas in the second direction and diffract the two sub-areas, the diffraction unit dividing the first light reflected by the recording medium into at least 6 light areas and diffracting the at least 6 light areas; and
a first photodetector including:
first and second light-receiving portions receiving the first light diffracted into a $+1^{st}$ or $-1^{st}$ order light by the first and second central diffraction areas and converting the first light into an electrical signal; and
third through sixth light-receiving portions receiving a $+1^{st}$ order light and/or a $-1^{st}$ order light diffracted by the first through fourth peripheral diffraction areas;
wherein the signal processor detects the tracking error signal and/or the centering signal of the photodetector from detection signals of at least some of the first through sixth light-receiving portions,
wherein the first direction is a radial direction and the second direction is a tangential direction,
wherein the first light reflected by the recording medium is divided into the central light area and the first peripheral light area and the second peripheral light area, and
wherein the first and second peripheral light areas are at respective sides of the central light area.

16. The optical recording and/or reproducing apparatus of claim 15, wherein each of the first and second central diffraction areas is one of a single diffraction area and a pair of light-receiving areas arranged in the second direction.

17. The optical recording and/or reproducing apparatus of claim 16, wherein:
the first light-receiving portion receives light diffracted by the first central diffraction area and is one of a single light-receiving area and a pair of light-receiving areas arranged in the first direction; and
the second light-receiving portion receives light diffracted by the second central diffraction area and is one of a single light-receiving area and a pair of light-receiving areas arranged in the first direction.

18. The optical recording and/or reproducing apparatus of claim 17, wherein, when the first through fourth peripheral diffraction areas are sequentially arranged clockwise or counterclockwise and signals detected from $+1^{st}$ or $-1^{st}$ order lights received by the first through sixth light-receiving portions are referred to as E, F, A, B, C, and D, respectively, the signal processor detects a tracking error signal (TES) given by the following equation:

TES=$((A+B)-(C+D))-k^* (E-F)$, wherein k>0.

19. The optical recording and/or reproducing apparatus of claim 18, wherein, when each of the first and second light-receiving portions is a pair of light-receiving areas arranged in the first direction, signals detected from $+1^{st}$ or $-1^{st}$ order lights received by the light-receiving areas of the first light-receiving portion are referred to as E1 and E2, and signals detected from $+1^{st}$ or $-1^{st}$ order lights received by the light-receiving areas of the second light-receiving portion are referred to as F1 and F2, the signal processor detects a radial centering signal (RAD CENTERING SIGNAL) of a photodetector given by the following equation:

RAD CENTERING SIGNAL=$(E1+F1)-(E2+F2)$.

20. The optical recording and/or reproducing apparatus of claim 17, wherein, when each of the first and second light-receiving portions is a pair of light-receiving areas arranged in the first direction, signals detected from $+1^{st}$ or $-1^{st}$ order lights received by the light-receiving areas of the first light-receiving portion are referred to as E1 and E2, and signals detected from $+1^{st}$ or $-1^{st}$ order lights received by the light-receiving areas of the second light-receiving portion are referred to as F1 and F2, the signal processor detects a radial centering signal (RAD CENTERING SIGNAL) of a photodetector given by the following equation:

RAD CENTERING SIGNAL=$(E1+F1)-(E2+F2)$.

21. The optical recording and/or reproducing apparatus of claim 16, wherein:
the first and second central diffraction areas divide a part of the central light area into two sub-areas in the first direction and diffract the two sub-areas; and
the diffraction unit further comprises a third central diffraction area diffracting the remaining part of the central light area.

22. The optical recording and/or reproducing apparatus of claim 21, wherein the first photodetector includes a seventh light-receiving portion receiving light diffracted by the third central diffraction area and including one of a single light-receiving area and a pair of light-receiving areas arranged in the second direction.

23. The optical recording and/or reproducing apparatus of claim 22, wherein the first light transmits an information reproduction signal which is a sum signal of signals detected from $+1^{st}$ or $-1^{st}$ order lights received by the third through sixth light-receiving portions and a signal detected from a $+1^{st}$ or $-1^{st}$ order light received by the seventh light-receiving portion.

24. The optical recording and/or reproducing apparatus of claim 22, wherein, when the seventh light-receiving portion is composed of a pair of light-receiving areas arranged in the second direction, and signals detected from $+1^{st}$ or $-1^{st}$ order lights received by the light-receiving areas of the seventh light-receiving portion are referred to as Y1 and Y2, the signal processor detects a tangential centering signal (TAN CENTERING SIGNAL) for the photodetector given by the following equation:

TAN CENTERING SIGNAL=$Y1-Y2$.

25. The optical recording and/or reproducing apparatus of claim 15, wherein each of the first and second light-receiving portions is wide in the first direction.

26. The optical recording and/or reproducing apparatus of claim 25, wherein:
the first and second light-receiving portions are arranged in the second direction; and
patterns are formed on the first and second central diffraction areas so that the $+1^{st}$ or $-1^{st}$ order lights diffracted by the first and second central diffraction areas are received by the first and second light-receiving portions.

27. The optical recording and/or reproducing apparatus of claim 15, wherein patterns are formed on the first through fourth peripheral diffraction areas so that one of the $+1^{st}$ and $-1^{st}$ order lights diffracted by the first through fourth peripheral diffraction areas is diverged relatively to a zeroth order light and that the other light is converged relatively to the zeroth order light.

28. The optical recording and/or reproducing apparatus of claim 27, wherein:
the first through fourth peripheral diffraction areas are sequentially arranged clockwise or counterclockwise;
the $-1^{st}$ order lights diffracted by the first and third peripheral diffraction areas and the $+1^{st}$ order lights diffracted by the second and fourth peripheral diffraction areas are focused at a first focal point, and the $+1^{st}$ order lights diffracted by the first and third peripheral diffraction areas and the $-1^{st}$ order lights diffracted by the second and fourth peripheral diffraction areas are focused at a second focal point; and
the first photodetector is located between the first and second focal points in an on-focus state.

29. The optical recording and/or reproducing apparatus of claim 15, wherein the wavelength of the first light is a first wavelength, and the optical pickup further comprises a second light source emitting a second light having a wavelength different from the first wavelength, the first and second wavelengths being usable with recording media of different formats.

30. The optical recording and/or reproducing apparatus of claim 29, wherein one of the first and second lights is in an infrared wavelength range suitable for recording data in and/or reproducing data from a CD-family recording medium, and the other lights is in a red wavelength range suitable for recording data in and/or reproducing data from a DVD-family recording medium.

31. The optical recording and/or reproducing apparatus of claim 29, wherein the diffraction unit is disposed between the first light path changer and the objective lens and includes:
a polarization hologram layer selectively diffracting the first light according to a polarization of the first light in such a way that a first light traveling from the first light source toward a recording medium is transmitted and a first light reflected by the recording medium is diffracted and transmitting the second light; and
a polarization change layer formed on a side of the polarization hologram layer that faces the recording medium, changing a polarization of an incident light.

32. The optical recording and/or reproducing apparatus of claim 15, wherein the diffraction unit is disposed between the first light path changer and the objective lens and includes:
a polarization hologram layer transmitting the first light traveling from the first light source toward a recording medium and diffracting the first light reflected by the recording medium; and
a polarization change layer formed on a side of the polarization hologram layer that faces the recording medium, changing the polarization of the incident light.

33. A method of suppressing generation of an offset in a tracking error signal due to an initial photodetector balance deviation, comprising:
dividing the light reflected from a recording medium into a central light area and first and second peripheral light areas at respective sides of the central light area;
dividing, at first and second central diffraction areas, at least a part of a central light area into two sub-areas in a radial direction and diffracting light to the at the two sub-areas;
dividing, at first and second peripheral diffraction areas, a first peripheral light area into two sub-areas in a tangential direction and diffracting light to the two sub-areas;
dividing, at third and fourth peripheral diffraction areas, a second peripheral light area into two sub-areas in a second direction and diffract light to the two sub-areas;
receiving, at first and second light-receiving portions of a photodetector, the light diffracted into a $+1^{st}$ or $-1^{st}$ order light by the first and second central diffraction areas and converting the first light into an electrical signal; and
receiving, at third through sixth light-receiving portions, a $+1^{st}$ order light and/or a $-1^{st}$ order light diffracted by the first through fourth peripheral diffraction areas,
wherein, the diffraction unit dividing the first light reflected by the recording medium into at least 6 light areas and diffracting the at least 6 light areas.

34. A diffraction unit dividing a light reflected by a recording medium into at least 6 light areas and diffracting the at least 6 light areas, comprising:
first and second central diffraction areas which divide at least a part of a central light area of the reflected light into two sub-areas in a radial direction and diffract the two sub-areas;
first and second peripheral diffraction areas which divide a first peripheral light area of the reflected light into two sub-areas in a tangential direction and diffract the two sub-areas; and
third and fourth peripheral diffraction areas which divide a second peripheral light area of the reflected light into two sub-areas in the tangential direction and diffract the two sub-areas.

35. The optical pickup of claim 1, wherein the first and second central diffraction areas are arranged in a radial direction.

* * * * *

UNITED STATES PATENT AND TRADEMARK OFFICE
CERTIFICATE OF CORRECTION

| | | |
|---|---|---|
| PATENT NO. | : 7,362,689 B2 | Page 1 of 1 |
| APPLICATION NO. | : 10/926150 | |
| DATED | : April 22, 2008 | |
| INVENTOR(S) | : Sun-mook Park et al. | |

It is certified that error appears in the above-identified patent and that said Letters Patent is hereby corrected as shown below:

Column 25, Line 10, after "direction" insert --,--.

Column 30, Line 12, after "to the" delete "at the".

Signed and Sealed this

Second Day of September, 2008

JON W. DUDAS
*Director of the United States Patent and Trademark Office*